United States Patent [19]

Shimizu

[11] Patent Number: 5,671,449
[45] Date of Patent: Sep. 23, 1997

[54] SWITCHING SYSTEM FOR CAMERA

[75] Inventor: Hitoshi Shimizu, Tokyo, Japan

[73] Assignee: Asahi Kogaku Kogyo Kabushiki Kaisha, Tokyo, Japan

[21] Appl. No.: 669,614

[22] Filed: Jun. 24, 1996

Related U.S. Application Data

[63] Continuation of Ser. No. 301,776, Sep. 7, 1994, abandoned.

[30] Foreign Application Priority Data

| Sep. 7, 1993 | [JP] | Japan | 5-247363 |
| Sep. 7, 1993 | [JP] | Japan | 5-247364 |
| Sep. 7, 1993 | [JP] | Japan | 5-247365 |
| Sep. 21, 1993 | [JP] | Japan | 5-257759 |

[51] Int. Cl.$^6$ .................... G03B 1/18; G03B 9/02
[52] U.S. Cl. ............................ 392/132; 392/131
[58] Field of Search .................. 354/195.1, 195.11, 354/195.12, 270, 271.1; 396/76, 103, 505, 506, 508, 131–133

[56] References Cited

U.S. PATENT DOCUMENTS

| 4,589,753 | 5/1986 | Kawai | 354/195.1 |
| 4,610,523 | 9/1986 | Tsuboi | 354/195.1 |
| 4,695,144 | 9/1987 | Yoshino et al. | 354/195.11 |
| 4,696,559 | 9/1987 | Kondo | 354/195.1 |
| 4,728,979 | 3/1988 | Akitake et al. | 354/195.1 |
| 5,237,357 | 8/1993 | Morisawa | 354/271.1 |
| 5,313,244 | 5/1994 | Arai | 354/271.1 |
| 5,341,190 | 8/1994 | Ogawa | 354/195.1 |
| 5,365,301 | 11/1994 | Sugita et al. | 354/195.1 |
| 5,461,441 | 10/1995 | Kotani | 354/195.1 |

*Primary Examiner*—Safet Metjahic
*Assistant Examiner*—Michael Dalakis
*Attorney, Agent, or Firm*—Greenblum & Bernstein P.L.C.

[57] ABSTRACT

A switching system for a camera is able to selectively transmit the motive power of a motor to either of a drive system for controlling an aperture or a drive system for controlling a zooming function. The switching system uses either (a) a transmission to couple either a telephoto or a wide-angle drive system, or (b) a direct coupling to the aperture drive system. The transmission to the zoom drive system has a range of play and a catch, and is controlled when the catch holds an aperture control lever away from the aperture drive system. The aperture drive system is controlled in the range of play of the transmission when the catch allows the aperture control lever to connect to the aperture drive system.

52 Claims, 17 Drawing Sheets

FIG. 18

| | 200M TELE | 200M WIDE | APERTURE CLOSE | APERTURE OPEN |
|---|---|---|---|---|
| A | H | L | H | L |
| B | L | H | L | H |
| C | H | L | H | L |
| D | L | H | L | H |
| F | H | H | L | L |
| G | L | L | H | H |
| J | H | H | L | L |
| K | L | L | H | H |

FIG. 15

| | 200M TELE | 200M WIDE | APERTURE CLOSE | APERTURE OPEN |
|---|---|---|---|---|
| A | H | L | H | L |
| B | L | H | L | H |
| C | H | L | H | L |
| D | L | H | L | H |
| E | H | H | L | L |

SWITCHING SYSTEM FOR CAMERA

This application is a continuation of application Ser. No. 08/301,776, filed Sep. 7, 1994, now abandoned.

BACKGROUND OF THE INVENTION

Modern camera typically have several motor driven and motor actuated systems. Motor driven and motor actuated systems may be used for tasks such as zooming, focusing, advancing film, setting an aperture iris, or shutter release. Even though the tasks may be sequentially performed, each driven system conventionally has an individually dedicated motor or actuator.

A camera using several individual dedicated motors and actuators to perform individual tasks suffers the disadvantage that the cost and bulk of the camera are increased because of the number of motors and actuators used.

SUMMARY OF THE INVENTION

It is therefore an object of the present invention to provide a switching system for a camera which allows a single driving system to perform two tasks sequentially.

According to the present invention, a switching system for a camera includes a main drive with a motor for transmitting a motive force of the motor, a zoom drive system for transmitting a motive force to a zoom lens group to move the zoom lens group in wide-angle and telephoto directions, an aperture drive system for transmitting a motive force to an aperture to open and close the aperture; a transmission, coupled to the main drive, for selectively transmitting the motive force of the motor to the zoom drive system and the aperture driven system, and a switch applying a force to the transmission to switch the transmission between the zoom drive system and the aperture drive system. The switching system preferably further comprises a resilient member, for biasing the transmission towards one of the aperture or zoom drive system. Further preferably, the transmission is connected in a neutral state to the aperture drive system, and is selectively connected to the zoom drive system when the switching means is switched.

According to still another aspect of the present invention, the switching system comprises an electromagnet and a pushing member in which the electromagnet acts on the pushing member to selectively switch the transmission between the aperture and zoom drive systems.

According to yet another aspect of the present invention, the switch comprises a solenoid for selectively pushing the transmission towards one of the zoom or aperture drive systems. In this case, at least part of the transmission is made of a ferromagnetic material, and the solenoid acts on the transmission to selectively switch the transmission between a first and second working drive systems.

According to yet still another aspect of the present invention, the transmission includes a first shaft that moves linearly along its axis and that has an engaging portion at each distal end. The aperture drive system includes a second shaft coaxially aligned with the first shaft and having an engaging portion at a distal end, and the zoom drive system comprises a third shaft coaxially aligned with the first shaft and having an engaging portion at a distal end. The first shaft moves linearly to engage one of the engaging portions at its distal ends with one engaging portions of the coaxially aligned second or third shafts when the transmission is switched. The engaging portions engage to transmit the motive force transmitted by the transmission to the aperture drive system or to the zoom drive system of the camera. In this case, the engaging portions are optionally formed on the facing surfaces of the distal ends of the shafts. When applied with the solenoid switch, the engaging portions are preferably cup-cone couplings, and the second shaft and the third shaft are preferably permanent magnets. In this case, the first shaft is held by the magnetic force of the second shaft or the third shaft, depending on the switching of the transmission, when the transmission is switched.

According to yet still another aspect of the present invention, a switching system for a camera comprises a main drive including a motor, the main drive transmitting a motive force of the motor, an aperture, an aperture drive system for transmitting the motive force of the motor to the aperture to open and close the aperture, a zoom lens group, a zoom drive system for transmitting the motive force of the motor to at least the zoom lens group to move the zoom lens group in telephoto and wide-angle directions, a transmission, coupled to the main drive, for selectively applying or removing the motive force of the main drive to the zoom drive system, and a switch, for applying or removing a motive force of the aperture drive system to and from the aperture. The transmission and the switch sequentially apply and remove the motive force of the main drive to the aperture and to the zoom drive system. The transmission includes a drive portion and a driven portion, the drive and driven portions engaged to transmit a motive force of the drive portion to the driven portion, and the engagement between the drive portion and the driven portion has a range of play within which the driven portion is free of the motive force of the drive portion. The motive force of the main drive is only transmitted to the zoom drive system by the transmission when the driven portion is outside of the range of play of the engagement between the drive and driven portions. The motive force of the main drive system is transmitted to the aperture when the drive portion is within the range of play of the engagement.

The switching system of this aspect of the invention preferably further includes a controller for activating and controlling the motor. The controller monitors a relationship between the aperture drive system and the range of play of the engagement between the drive and driven portions of the transmission. In this case, the controller preferably rotates the motor in a predetermined direction and controls the motor to rotate by a predetermined amount in response to the monitored relationship. The predetermined amount of motor rotation is a number of rotations of the aperture drive system to move the aperture to an aperture-closing position after rotating at least once to a position where the aperture is fully open, and the predetermined direction is a wide-angle zooming direction of the zoom drive system. Further according to this aspect of the invention, the aperture driven system preferably includes a device for applying and removing a motive force of the aperture drive system to the aperture to open and close the aperture, and the switch switches the device for applying and removing the motive force of the aperture driven system to the aperture. The motive force of the main drive system is transmitted to the zoom drive system when the driven portion is outside of the range of play of the engagement, and when the switch switches the device for applying and removing the motive force of the aperture drive system to remove the motive force of the aperture drive system from the aperture. The switch preferably further includes a holder for holding the aperture in a closed position. Further according to this aspect of the invention, the drive and driven portions preferably includes rotating members that engage each other at a sub-range of engagement within a predetermined range of interaction of their respective ranges of rotation, and the range of play is defined by the part of the range of interaction that is outside the sub-range of engagement.

According to a still further aspect of the present invention, a method of switching a motive force of a main drive to a zoom drive system and to an aperture in a camera includes the first step of monitoring the angular position of a rotating drive member of the main drive, in which the rotating drive member is directly coupled with a whole number drive ratio to an aperture drive system for operating the aperture, and where the rotating drive member further drives the zoom drive system at either of one of a first and second contact points, a first rotating direction of the rotating drive member being away from the second contact point and towards the first contact point and a second rotating direction of the rotating drive member being away from the first contact point and towards the second contact point. Succeeding steps include driving the rotating drive member, and the aperture drive system, in the first rotating direction by an angular amount of at least the angular range from the first contact point to the second contact point, to an angular position corresponding to a aperture closed position of the aperture, detecting the depression of a release switch, setting an aperture size variable to a value between the aperture-closed and aperture-open, driving the rotating drive member and the aperture drive system in the second rotating direction to a variable angular position of the rotating drive member corresponding to the set value of the aperture size variable. In this case an angular range in the second rotating direction, from the aperture-closed position to the aperture-open position, is equal to or less than an angular range, in the second rotating direction, from the first contact point to the second contact point. Preferably, the method further includes steps of disconnecting the aperture from the aperture drive system while holding the aperture closed and connecting the aperture to the aperture drive system while releasing the aperture to open, in which the disconnecting step precedes the monitoring step, and the connecting step immediately follows the variable setting step.

According to all of the described aspects of the invention, the switching system preferably includes a movable switching member, and at least the motor is associated with the movable switching member. The motor is started and stopped in forward and reverse directions with the movement of the switching member. The movement of the switching member is preferably a sliding movement or according to a push of a push-button switch. The movable switching member is also optionally associated with the transmission.

DESCRIPTION OF THE ACCOMPANYING DRAWINGS

FIG. 15 is a logic chart describing the operations of a motor control circuit and an electromagnet control circuit according to a second embodiment of the present invention.

FIG. 18 is a logic chart describing the operations of a motor control circuit and a solenoid control circuit according to a third embodiment of the present invention.

DESCRIPTION OF THE EMBODIMENTS

Figure 1:
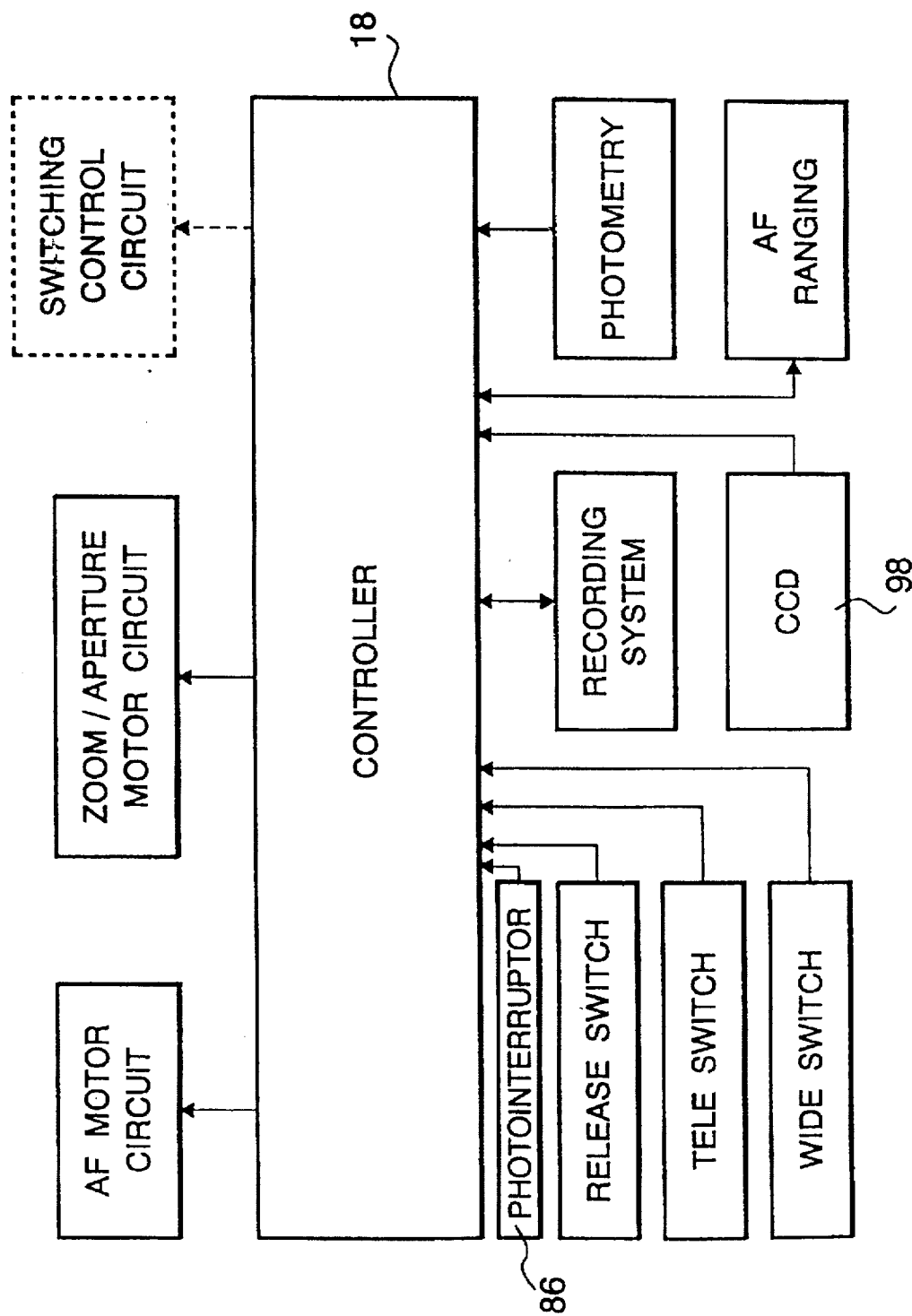
FIG. 1 is a block diagram of a controller associated with the switching system of the present invention.

A digital still camera to which the present invention is applied comprises a controller 18. FIG. 1 shows a block diagram of the controller 18 and the controlled portions of the camera to which the present invention is applied. The camera comprises at least a switching system 1, an imaging system 9, a main drive 5, an aperture drive system 6, a zoom drive system 6, an autofocus (AF) drive system, a controller 18, a photometry measurement portion, an AF ranging portion, a release switch, and an image recording and storage system.

The controller 18 controls all the functions and sequencing of the camera, as seen in the block diagram of FIG. 1. The controller 18 comprises, for example, a microprocessor unit and associated control chip set. The photometry measurement portion measures the luminance of the subject to be imaged, and is read by the controller 18. The AF ranging portion measures the distance to the subject to be imaged by a passive or active method, and is also read by the controller 18. The AF drive system includes a motor and is used to move the lenses to an in-focus position according to impulses sent by the controller 18, and determined by the measurement from the AF ranging portion.

The release switch has two steps. When depressed to the first step, the photometry measurement portion and the AF ranging portion are activated, and when further depressed to the second step, at least the imaging system 9, the aperture drive system 6, the main drive 5, and the aperture 8 are controlled. At the second step, the CCD (Charge Coupled Device) 98 is charged and an image signal, corresponding to an image formed on the CCD 98 by light passing through the lenses, is recorded to the recording system. The recording system preferably comprises a memory or a magnetic recording medium or both.

Figure 2:
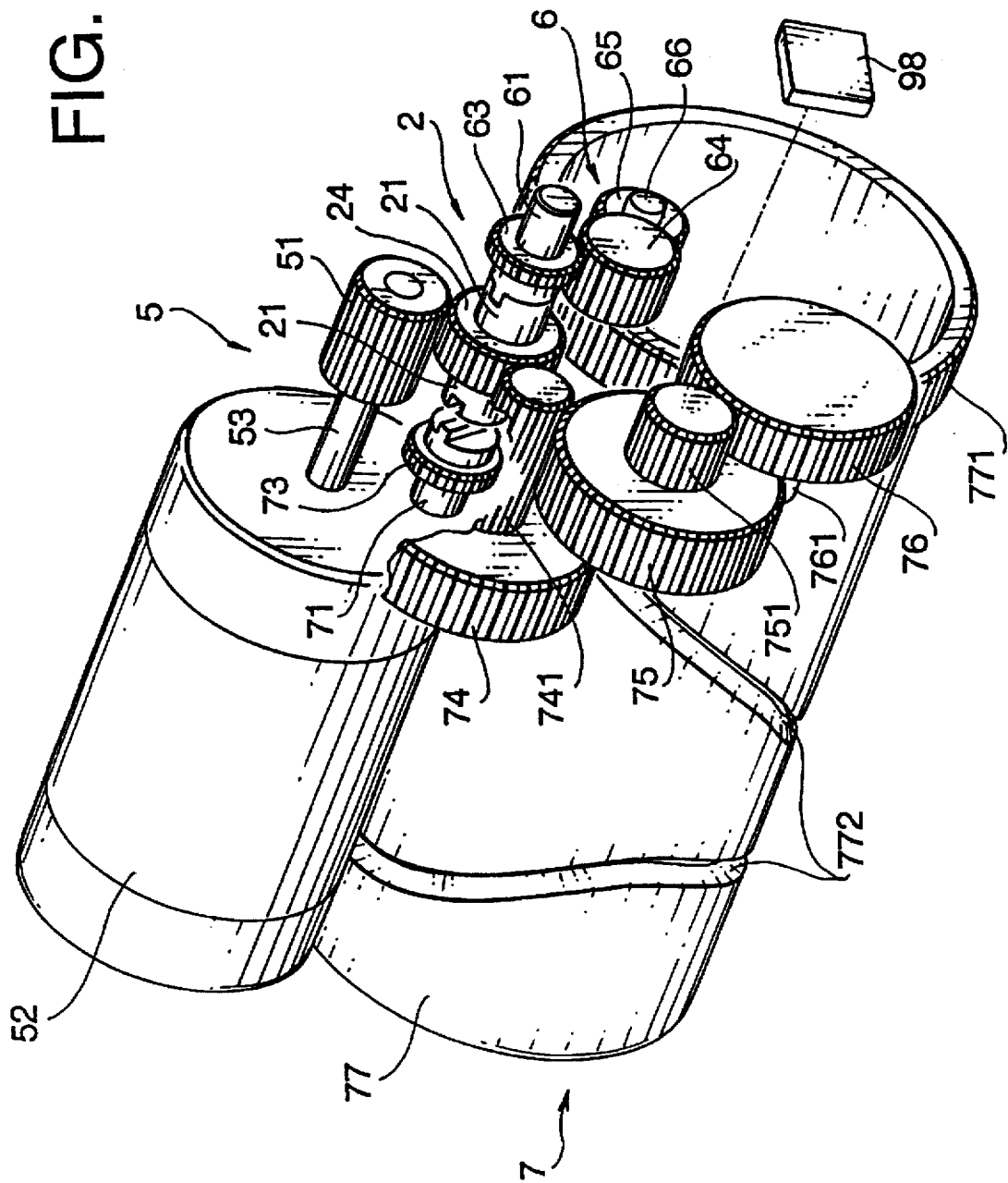
FIG. 2 is a perspective view of a switching system comprising a main drive, a transmission, an aperture drive system and a zoom drive system according to first, second, and third embodiments of the present invention.

FIG. 2 shows a perspective view of a main drive 5 according to the first to third embodiments of the present invention, and the transmission 2 which may couple with the aperture drive system 6 or the zoom drive system 7. As shown in FIG. 2, the main drive 5 comprises a motor 52, which drives a shaft-mounted facially elongated drive pinion 51. The drive pinion 51 engages a main transmission gear 24, which is fixedly and coaxially mounted on an axially movable transmission shaft 21. The transmission shaft 21 and coaxial main transmission gear 24 may move together in an axial direction, relative to the drive pinion 51, while the face width of the drive pinion 51 in the axial direction is long enough to cover the moving range of the transmission shaft 21. Therefore, at any position of the transmission along the range of possible axial movement, the main transmission gear 24 and the axially elongated drive pinion 51 remain engaged.

At one end of the movement range of the transmission shaft 21, the transmission shaft 21 couples with a reduction gear train of the zoom drive system 6. The gear train of the zoom drive system 6 comprises a zoom drive shaft 71 and zoom drive pinion 73 driving a series of coaxial unitary gear and pinion sets in turn: a first reduction gear 74 and coaxial pinion 741, a second reduction gear 75 and coaxial pinion 751, and a third reduction gear 76 and coaxial pinion 761. The zoom drive pinion 73 drives gear 74, the pinion 741 drives gear 75, the pinion 751 drives gear 76, and finally the pinion 761 drives a ring gear 771 provided to a cam ring 77. The cam ring 77 is rotatably mounted in the camera, and the ring gear 771 is formed at one end of the cam ring 77. Therefore, when the transmission shaft 21 is coupled with the zoom drive shaft, the cam ring 77 rotates at a reduced speed, according to the rotational direction of the motor 52. A curved cam groove 772 is formed in the circumferential surface of the cam ring 77.

The curved cam groove 772 mates with a projection 971 formed on the top of a front lens frame 97 inside the cam ring 77. A front lens group 93 is mounted in the front lens frame 97. A first guide shaft (fixed) 91 (see FIG. 7) and a rotating guide shaft 66, mounted inside the cam ring 77, restrict the movement of the front lens frame 97 so that it may move only linearly in the direction of the optical axis. The cam ring 77 is urged forward or back by the guiding action of the helical cam groove 772 on the projection 971. Although the rotating guide shaft 66 rotates as part of the aperture drive system 6, the lens frame 97 may move linearly guided by the rotating guide shaft 66. Therefore, when the cam ring 77 is rotated, the front lens frame 97 and front lens group 93 will move back and forth along the optical axis according to the rotation of the cam ring 77 and guided by the cam groove 772, giving the focal length of the optical system. An aperture 8 is fixed to the front lens frame 97 and moves with the front lens frame 97. A rear lens frame 95 and a rear lens group 92 are also positioned inside the cam ring 77, on the body side of the camera (to the right side of FIG. 7). The front lens group 93 and the rear lens group 92 together compose a zoom lens optical system. An image is formed on the CCD 96 by light passing through the zoom lens optical system.

Figure 6:
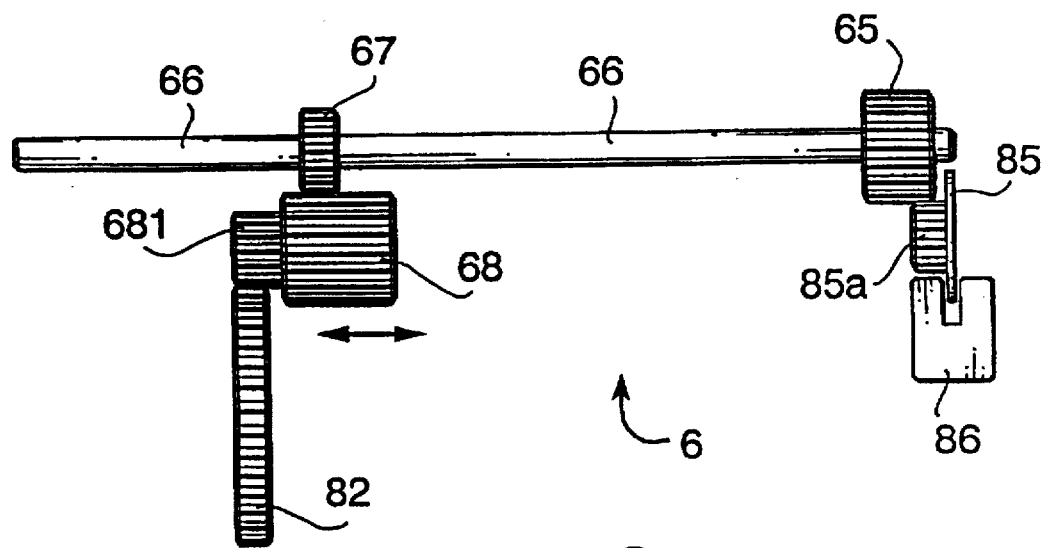
FIG. 6 is a plan view of a gear train and an encoder according to a first embodiment of the present invention.

FIG. 6 shows the aperture drive system 6. At the opposite end (to the zoom drive system 7 coupling end) of the movement range of the transmission shaft 21, the transmission shaft 21 instead couples with a gear train in the aperture drive system 6. The aperture drive system 6 gear train comprises: an aperture drive pinion 63, mounted on an aperture drive shaft 61; a first aperture intermediate gear 64; and a second aperture intermediate gear 65 fixed to the previously described rotating guide shaft 66. The rotating guide shaft 66 is rotatably supported on the inside of the cam ring 77. The rotating guide shaft 66 and the second aperture intermediate gear 65 therefore rotate together according to the rotation of the drive motor 52, when the aperture drive system 6 gear train is coupled to the transmission shaft 21.

The second aperture intermediate gear 65 engages gear teeth 85a on the encoder 85, and the encoder 85 is rotated according to the rotation of the gears in the train. A photo interruptor 86 is located near to the encoder 85 and senses the amount of rotation of the encoder 85. Further, a third aperture intermediate gear 67 is mounted coaxially on the rotating guide shaft 66; the third aperture intermediate gear 67 drives a unitary reduction gear and pinion set 68, 681. The gear and pinion set 68, 681 is rotatably provided to the movable aperture 8.

The unitary reduction gear and pinion 68, 681 move linearly in the direction of the optical axis, with the movement of the aperture 8 as the aperture 8 moves with the front lens frame 97. The pinion 681 finally drives a toothed aperture driving disk 82. The aperture driving disk 82 sets the level of aperture as described later. As the level of aperture must be set no matter what the position of the front lens frame 97 and the aperture 8 along the optical axis, the shifting gear 68 must be able to engage the third aperture intermediate gear 67 in any position. Therefore, the gear 68 is facially elongated in the direction of the optical axis, and may always engage the third aperture intermediate gear 67.

Figure 7:
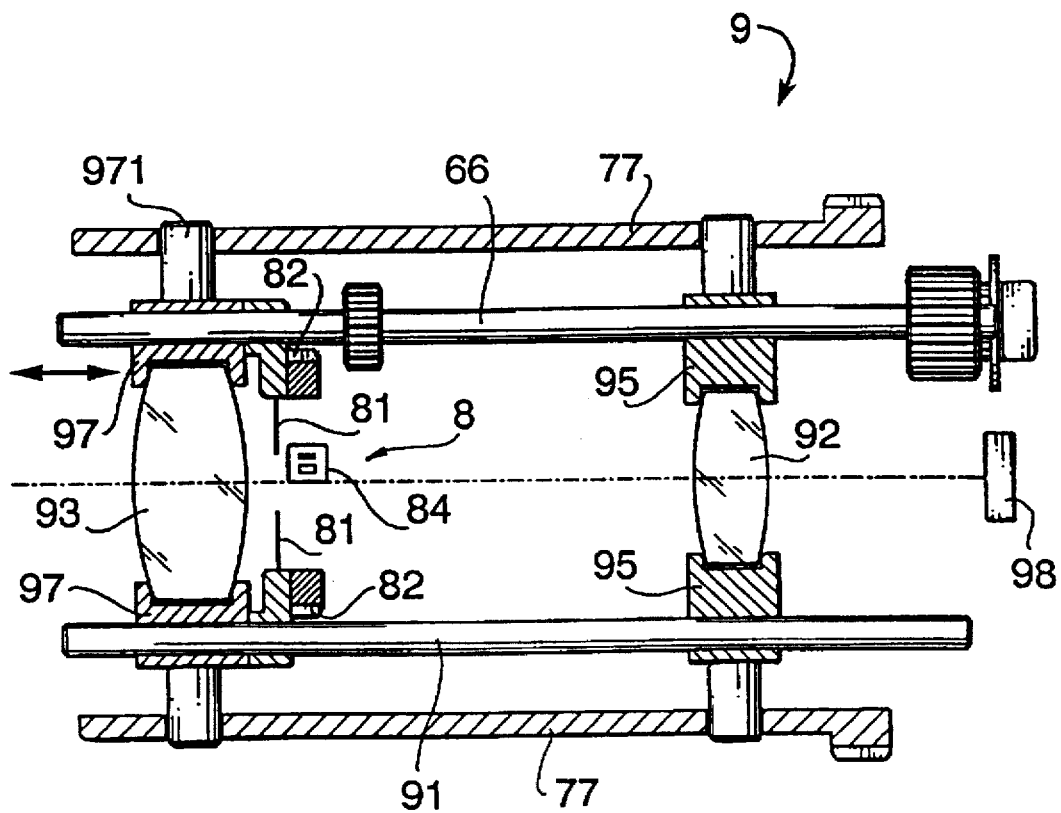
FIG. 7 is a detailed plan view of a cam ring and zoom drive system according to a first embodiment of the present invention.
Figure 8:
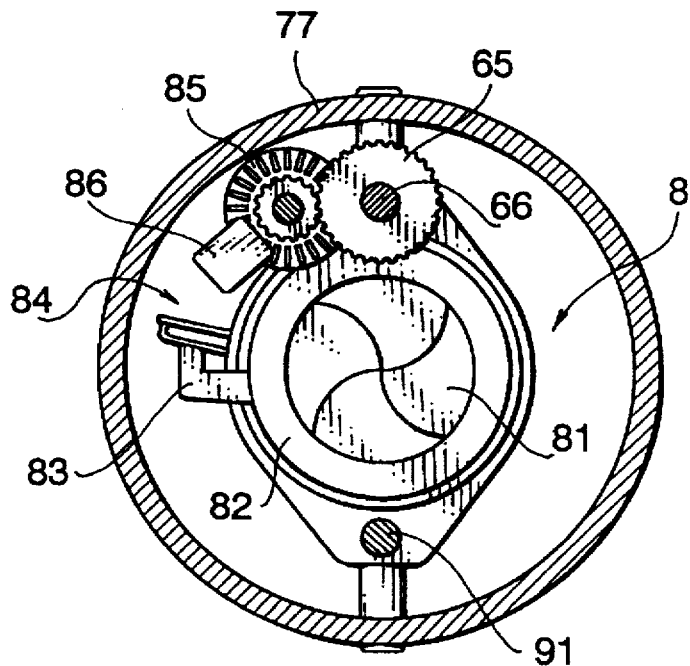
FIG. 8 is a partially cross-sectioned view showing a first state of a cam ring, a zoom drive system, and a contact switch actuator according to a first embodiment of the present invention.
Figure 9:
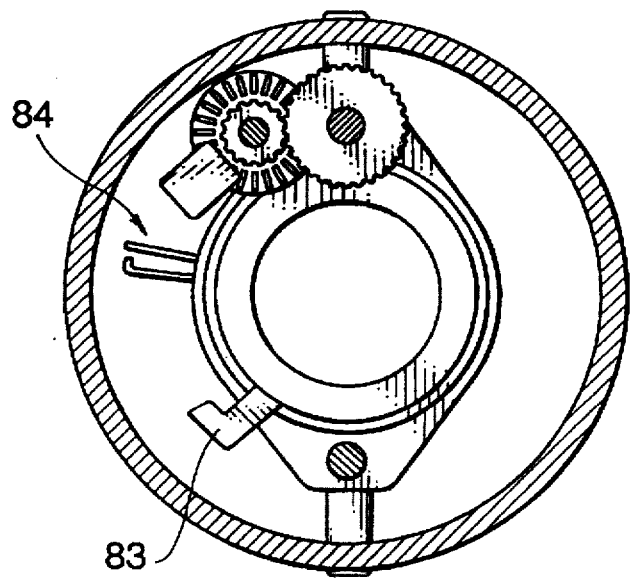
FIG. 9 is a partially cross-sectioned view showing a second state of a cam ring, a zoom drive system, and a contact switch actuator according to a first embodiment of the present invention.

The aperture 8 is shown in FIGS. 7, 8 and 9. The aperture (iris mechanism) 8 comprises a plurality of aperture blades 81, the toothed aperture driving disk 82, a contact switch actuator 83, and a contact switch 84, all of which are mounted inside the cam ring 77 and all of which move with the front lens frame 97.

The aperture driving disk 82 bears gear teeth around its outer circumference. The rotation of the aperture driving disk 82 by the pinion 681 moves the aperture blades 81 and changes the aperture setting thereby. The aperture status is determined by the controller 18 by means of the encoder 85, the photo interruptor 86 and the contact switch 84. The proper aperture value is determined based on the luminance data from the photometry sensor.

The contact switch 84 is arranged to send a signal when its contacts are closed. A contact switch actuator 83 is fixed to the aperture driving disk 82. As shown in FIG. 8, when the aperture blades 81 are fully shut, the contact switch 84 is pressed by the contact switch actuator 83, and the contact switch 84 indicates an ON status to the controller 18. When the aperture is not fully shut, the contact switch 84 is shut off.

FIG. 7 shows the imaging system 9. The imaging system comprises the solid state imaging receptor (in this case the CCD 98), a driving circuit (not shown) for the CCD 98, and the lens groups 92 and 93. An image borne by light passing through the first lens group 93, aperture 8, and second lens group 92 is formed on the CCD 98, interpreted by the controller 18, and stored in a memory or other data storage device (e.g., magnetic recording medium), (not shown).

Figure 3:
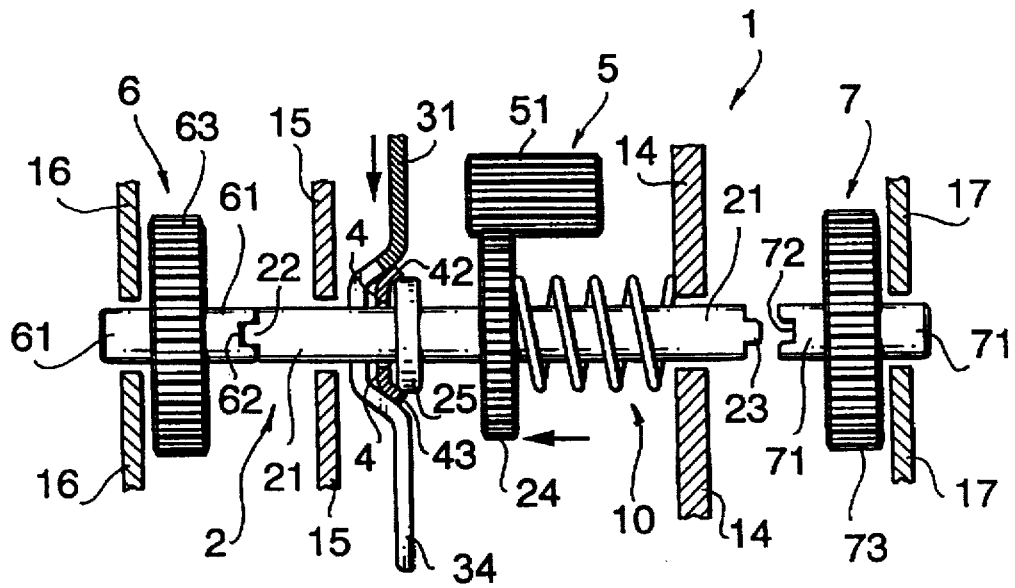
FIG. 3 is a partially cross-sectioned plan view of a first embodiment of a switching system according to the invention, showing a first driving state.
Figure 4:
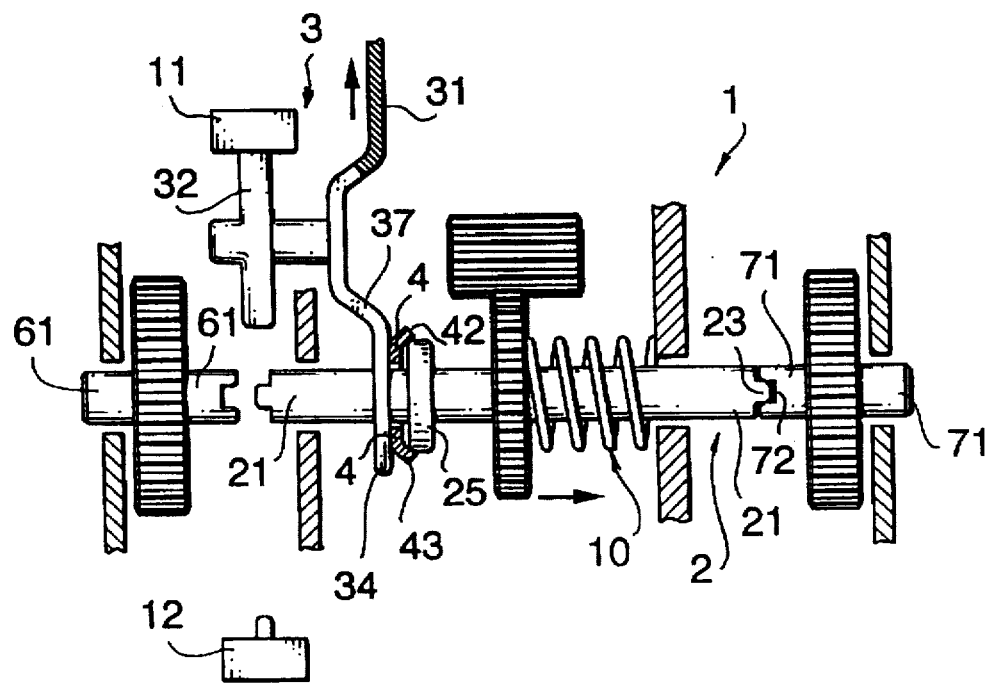
FIG. 4 is a partially cross-sectioned plan view of a first embodiment of a switching system according to the invention, showing a second driving state.
Figure 5:
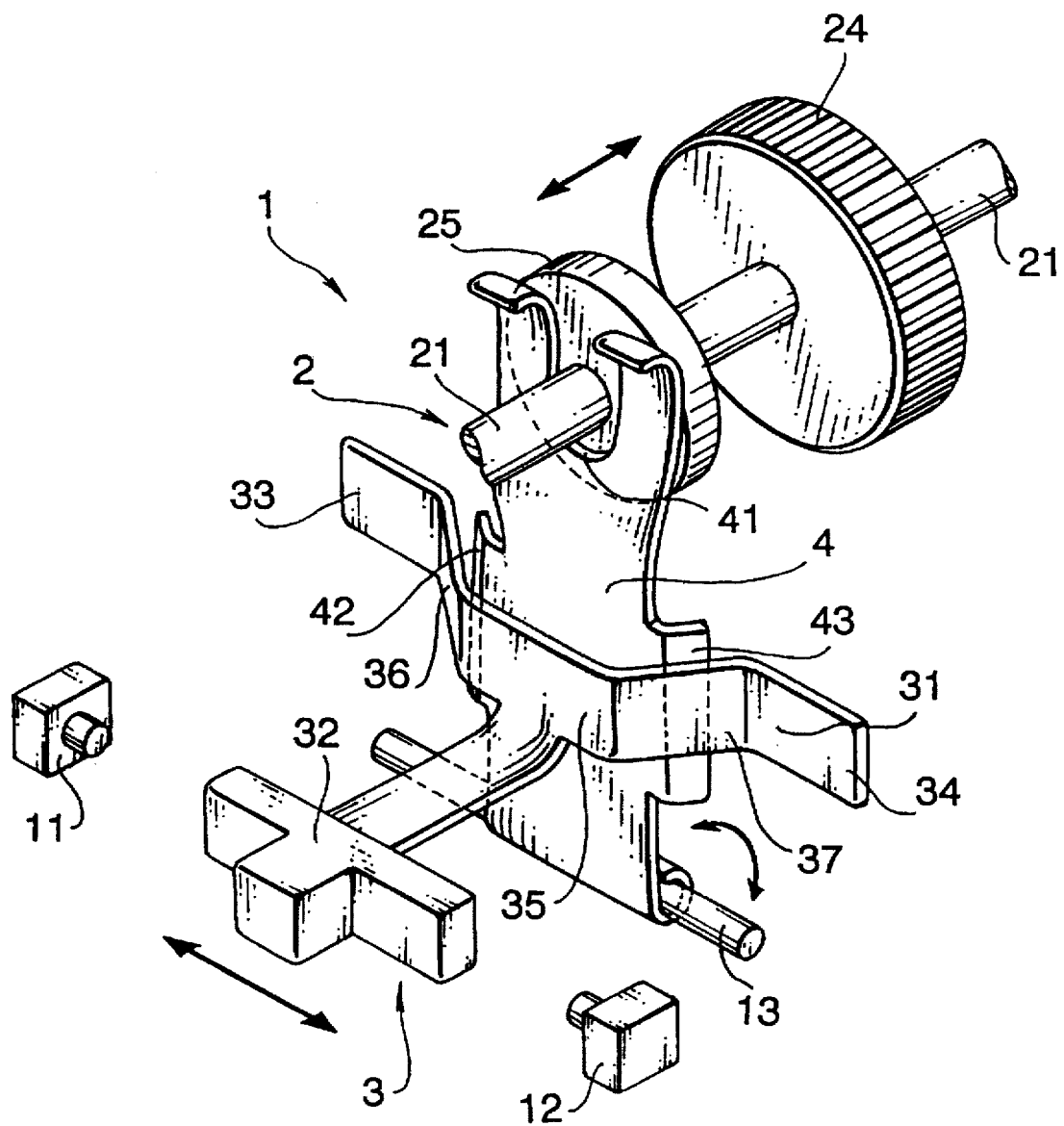
FIG. 5 is a perspective view of a first embodiment of a switching system according to the present invention.

FIGS. 3 through 5 show a first embodiment of a switching system 1 of the invention. In the first embodiment, the switching system 1 is able to selectively transmit the motive force of the motor 52 to either of the aperture drive system 6 or the zoom drive system 7. The switching system 1 of the first embodiment comprises a transmission 2, an operation member 3, a switching plate 31, a hinged member 4, switches 11 and 12, and a resilient compression spring 10. Switching between the aperture drive system 6 and the zoom drive system 7 is accomplished by means of the operation lever 32 and the switching plate 31.

The operation member 3 is mounted in the housing such that it is linearly movable. The operation member 3 comprises an operation lever 32 and a switching plate 31. The operation lever 32 is fixedly attached to the switching plate 31. The operation lever 32 and the switching plate 31 move together when the operation level 32 is moved by a user.

The operation member 3 is linearly slidable between two end positions and a central neutral position. The two end positions correspond to wide-angle and telephoto selection for the zoom drive system 7. At one end position of the operation lever 32 is a wide switch 12, which is used to indicate a wide-angle zooming direction to the controller, and at the opposite end is a tele switch 11, which is used to indicate a telephoto zooming direction to the controller. As shown in FIG. 5 when the operation lever 32 is pushed towards an end position, it actuates one of the switches 11 or 12. The operation lever 32 is urged by a biasing means (not shown) to return to the central neutral position when not pushed towards the wide-angle or telephoto positions.

The switching plate 31 therefore also has two end positions and a central neutral position, while the operation member 3 has a combination function of actuating the switches 11 and 12 by the operation lever 32 and further of moving a transmission 2 by means of the switching plate 31. The switching plate 31 consists of a bent member, having a central portion 35; two sloping portions 36, 37 on either side of the central portion 35, sloping away from the central portion 35 at equal obtuse angles; and two flat end portions 33, 34 extending away from the sloping portions 36, 37 at the end of each sloping portion 36, 37, and parallel and coplanar with each other and both equally displaced from the central portion 35.

The sloping portions 36, 37 and the two flat end portions of the switching plate 31 may contact in turn a hinged lever 4, as the switching plate is moved. The sliding portions of the operation lever 32, at end or neutral positions, thereby determines the position of the hinged member 4.

The hinged member 4 comprises a plate spring having at a front end a U-shaped notch 41. The rear end of the hinged member 4 is swingably mounted on a shaft 13. Intermediate the U-shaped notch 41 and the rear end of the hinged member 4, two sloping flange edges 42 and 43 are formed on either side of the hinged member 4.

When the switching plate 31 is in the neutral position, the sloping flange edges 42 and 43 contact the flat sloping portions 37 and 38, respectively, defining a neutral position of the hinged member 4. The neutral position of the hinged member 4 corresponds to the neutral position of the actuation member 3. When the switching plate 31 is linearly moved to an end position, a sloping portion 36 or 37 of the switching plate 31 pushes the corresponding sloping edge 42 or 43 of the hinged member 4, and the hinged member 4 is swingably displaced normal to the movement of the switching plate 31. Thereafter, one of the flat end portions 33 or 34 of the switching plate 31, depending on the sliding direction of the operation lever 32, contacts the hinged member 4 and maintains the hinged member 4 in a swingably displaced position as long as the switching plate 31 is linearly displaced.

The U-shaped notch 41 of the hinged member 4 accepts the transmission shaft 21. The portions of the hinged member 4 on either side of the U-shaped 41 notch are in contact with a disk flange 25 formed on the transmission shaft 21. When the hinged member 4 is displaced by the switching plate 31, the hinged member 4 presses on the disk flange 25, and the entire transmission 2 is similarly displaced.

The transmission 2 comprises the transmission shaft 21, coaxial main transmission gear 24, coaxial disk flange 25, and coupling protrusions 22, 23 at either distal end of the transmission shaft 21. The transmission shaft 21 is supported by supporting members 14 and 15 such that it is both rotatable and linearly movably along its axis. Supporting members 14 and 15 surround the transmission shaft 21 at a predetermined distances from either respective distal end of the transmission shaft 21.

The main transmission gear 24 of the transmission 2 is mounted coaxially on the transmission shaft 21, and intermediate the two supporting members 14 and 15. The main transmission gear 24 is engaged by the facially elongated drive pinion 51 as previously described.

Mounted in supporting members 16 and 17, but coaxially aligned with the transmission shaft 21, are an aperture drive shaft 61 and a zoom drive shaft 71, upon which are mounted aperture drive pinion 63 and zoom drive pinion 73 respectively. The aperture drive shaft 61 further comprises an aperture coupling groove 62. The aperture coupling groove 62 engages the previously described aperture coupling protrusion 22 of the transmission shaft 21 when the switching plate 31, the hinged member 4, and the transmission shaft 21 are in the neutral position. The neutral position may therefore be further defined as an aperture drive position.

When the transmission shaft 21 is displaced, the aperture coupling protrusion 22 is disengaged from the aperture coupling groove 62 of the aperture drive shaft 61, and at the opposite distal end of the main shaft 21, a zoom coupling protrusion 23 engages the zoom drive shaft 71 at a zoom coupling groove 72. Therefore, both end positions of the operation lever 32 are zoom drive positions.

As can be seen in FIGS. 3 and 4, a coil spring 10 biases the main transmission gear 24 away from the support member 14. The transmission shaft 21 is biased towards aperture drive shaft 61, so that the aperture coupling protrusion 22 and aperture coupling groove 62 are engaged when the previously described switching plate 31 is in the neutral position, and further so that the transmission shaft 21 will return to the aperture-coupled state following a displacement to the zoom-coupled state.

The combined operation of the first embodiment of a switching system 1 and the associated systems is described.

As shown in FIGS. 3 and 5, when the operation lever 32 is in the center or neutral position, neither the tele 11 nor the wide switch 12 is actuated. In this state, the flat sloping portions 36, 37 of the switching plate 31 contact the sloping flange edges 42, 43 of the hinged member 4. As can be seen in FIG. 3, in this condition, the transmission shaft 21 is biased towards the aperture drive shaft 61, and the aperture coupling protrusion 22 and the aperture coupling groove 62 may be engaged. Specifically, if the aperture coupling protrusion 22 and the aperture coupling groove 62 are rotatively aligned, they will be immediately engaged. If the protrusion 22 and groove are not rotatively aligned, they become engaged upon the first half-rotation of the transmission shaft 21. Thus, the main drive 5, the transmission 2, and the aperture drive system 6 are coupled when the switching system 1 is in a neutral state. Meanwhile, the zoom coupling protrusion 23 and the zoom coupling groove 72 are disengaged.

As shown in FIG. 4, when a user slides the operation lever 32 to the tele switch 11, the switching plate 31 is moved together with the operation level 32. The sloping portion 37 of the switching plate 31 then contacts the sloping flange edge 43 of the hinged member 4, and pushes the hinged member 4 in a direction along the axis of the transmission shaft 21, by virtue of the mating sloping portions 37 and 43. As the hinged member 4 is swingably supported and contacts the disk flange 25 of the transmission shaft 21, the hinged member 4 swings under the bias of the switching plate and pushes the transmission shaft 21 away from the aperture drive shaft 21, uncoupling the aperture coupling protrusion 22 and the aperture coupling groove 62. The aperture drive system 6 is thereby disconnected from the transmission 2.

As the operation lever 32 continues towards the Tele switch 11, the flat end portion 34 of the switching plate 31 comes into contact with the hinged member 4. The displacement amount of the flat end portion 34 corresponds to a required displacement amount for the transmission shaft 21 to engage the zoom drive system 7. As the flat end portion 34 contacts the hinged member 4, the zoom coupling protrusion 23 of the transmission shaft 21 is brought into contact with the zoom coupling groove 72 of the zoom drive shaft 71, and thereby engaged. If the zoom coupling protrusion 23 and the zoom coupling groove 72 are rotatively aligned, they will be immediately engaged. If the protrusion 23 and groove 72 are not rotatively aligned, the resiliency of the hinged plate spring 4 absorbs the non-engaged length of the protrusion 23 until the protrusion 23 and groove 72 become engaged upon the first half-rotation of the transmission shaft 21. The zoom drive system 7, the transmission 2, and the main drive 5 are then coupled.

When the operation lever 32 reaches the tele switch 11, the tele switch 11 is actuated. Of course, the wide switch 12 remains unactuated. When the tele switch 11 is actuated, the motor 52 is rotated in a direction corresponding to telephoto operation, and drives the transmission 2 and the transmission shaft 21. The rotational speed of the transmission shaft 21 is not so high as to pose difficulties in engaging the zoom coupling protrusion 23 and zoom coupling groove 72.

When the operation lever 32 is pushed towards the wide switch 12, the switching system mechanically operates in a manner symmetrically analogous to the described actuation of the tele switch 11. However, the wide switch 12 is actuated instead of the tele switch 11, and the motor 52 is controlled to instead turn in a direction corresponding to a wide-angle zooming adjustment of the camera. The wide-angle direction is the rotatively opposite direction to the aforementioned telephoto zooming direction.

When the user actuates the tele switch 11, coupling the transmission 2 with the zoom drive system 7, and rotating the motor 52 in the telephoto direction, the front lens group 93 (See FIG. 7) moves away from the rear lens group 92, and the focal length is lengthened. When the wide switch 12 is actuated, coupling the transmission 2 with the zoom drive system 7 again the motor is turned instead in the wide-angle direction, and the front lens group 93 is moved towards the rear lens group 92, shortening the focal length.

When the desired focal length is set as above, the operation lever 32 is release and returned under bias to the centrally located neutral position. The wide and tele switches are not actuated, and the motor 52 is therefore idle. Further, the transmission 2 is not coupled to the zoom drive system 7, but is instead coupled to the aperture drive system 6.

At this point, the focal length is set, and the user may press the release switch to the first step, and then to the second step. At the first step of the release switch, the autofocus ranging measurement and the photometry measurement are taken by the respective portions, and the appropriate aperture level is calculated by the controller 18. At the second step, the controller 18 drives the motor 52 in the appropriate direction and sets the aperture 8 to the appropriate level, the motor 52 being coupled to the aperture drive system 6 and the aperture 8.

After the aperture 8 is set, the CCD 98 is charged for a determined period by a driving circuit. That is, the equivalent of a shutter release is performed, and the CCD 98 records an image in the recording system. The motor 52 is then driven in the aperture-closing direction and the aperture 8 is closed.

Figure 10:
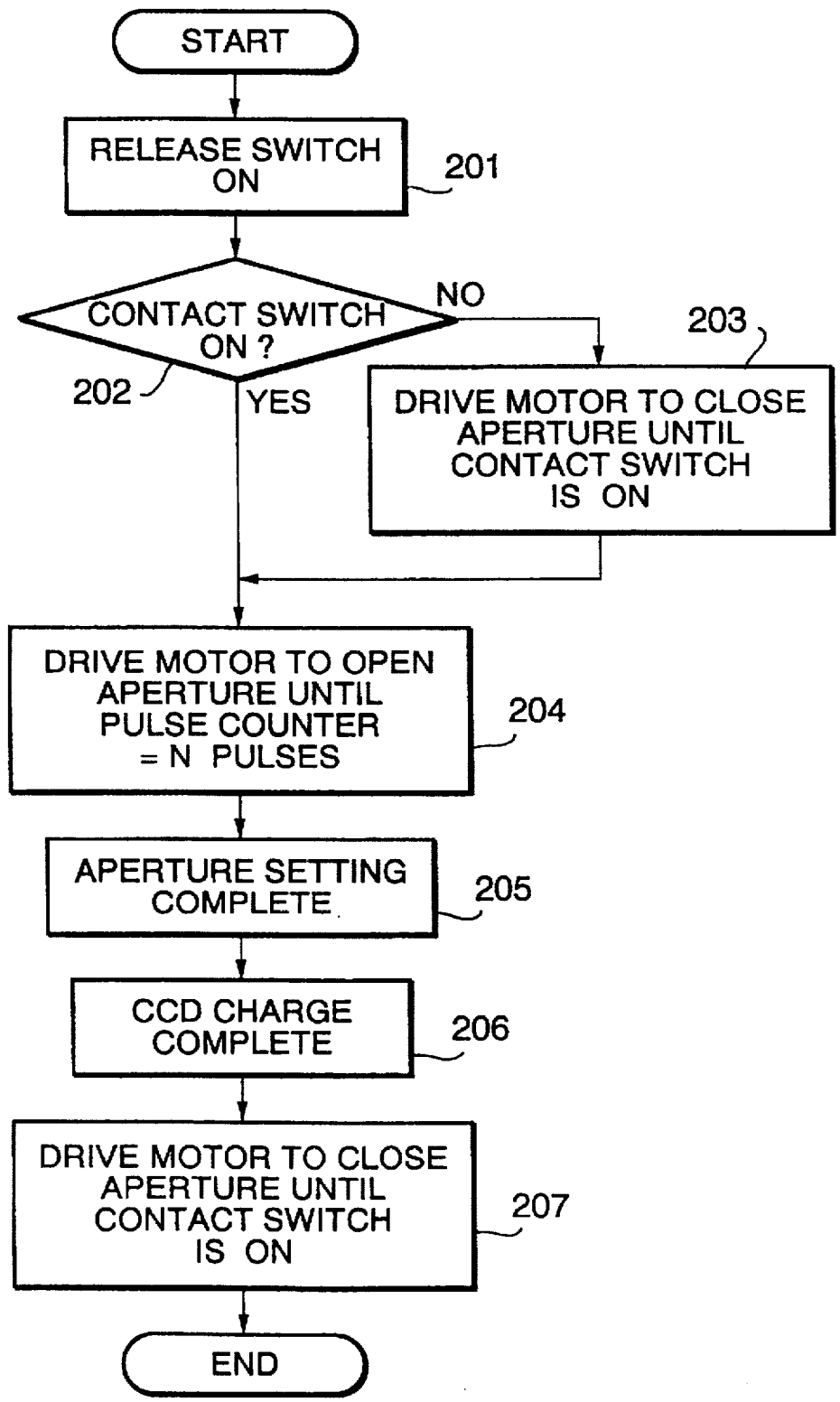
FIG. 10 is a flow chart describing an aperture control procedure according to first, second, third, and fourth embodiments of the present invention.

FIG. 10 shows a flow chart describing the operation of the aperture following the pressing of the release switch to the second step (flowchart step 201).

When the release switch is pressed to the second step flowchart step 201), the contact switch 84 on the aperture is checked. If the contact switch 84 is found to be OFF, the motor 52 is driven in the aperture-closing direction until the contact switch is ON in step 203, and then the control flow passes to the motor-driving step 204. If the contact switch is ON immediately after the release switch is pressed to the second level, the control flow passes directly to the motor-driving step 204, bypassing aperture-closing step 203.

The motor 52 is then driven in the aperture-opening direction. A number of pulses N, generated by the photo-interruptor 86 and encoder 85, are counted. When the number of pulses N reaches a number of pulses corresponding to the correct aperture setting, the motor is stopped. When the aperture setting is completed (step 205), the CCD 98 is charged (step 206) and an image is captured. The motor 52 is then driven in the aperture-closing direction until the contact switch 84 is ON, indicating that the aperture 8 is closed.

In the first embodiment, the slidable operation level 32 is used to move the switching plate 31, a rotatable or other operation level may be used to accomplish the same end. Although the position of the operation lever 32 is used to control both the aperture drive system 6 and the zoom drive system 7, a dedicated control member may be provided to operate the zooming drive system 7.

Figure 11:
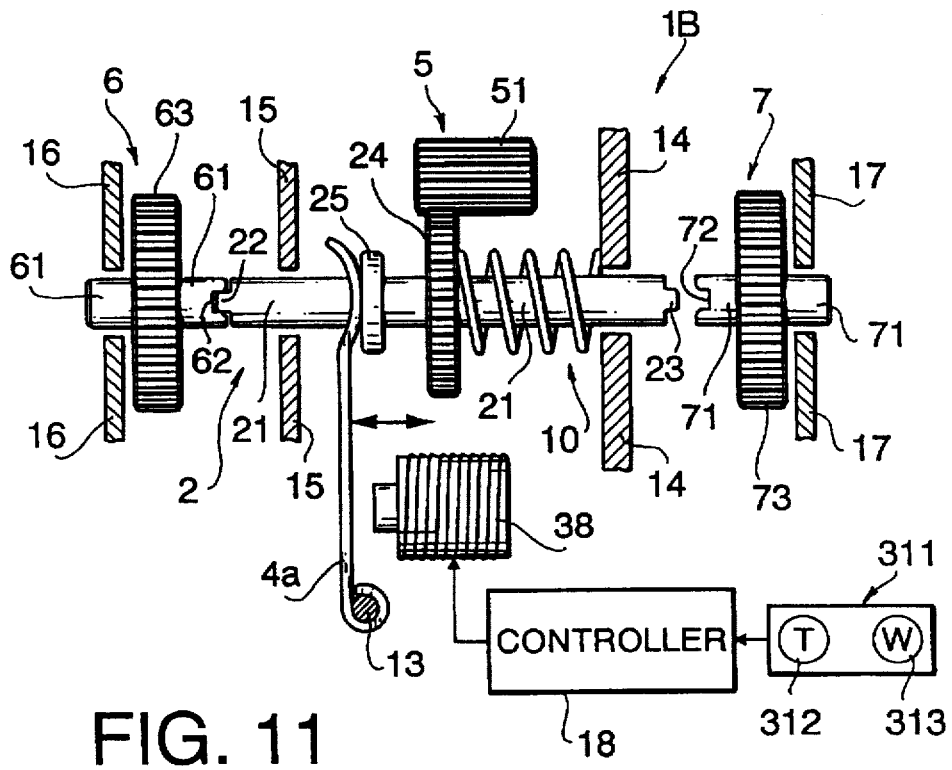
FIG. 11 is a partially cross-sectioned plan view of a second embodiment of a switching system according to the invention, showing a first driving state.
Figure 12:
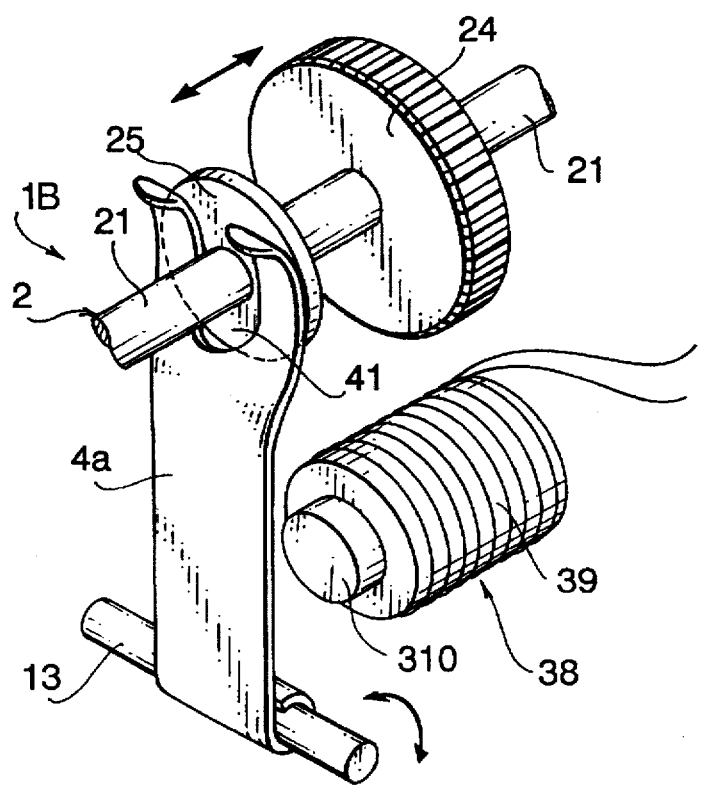
FIG. 12 is a perspective view of a second embodiment of a switching system according to the present invention.

FIGS. 11 and 12 show a second embodiment of a switching system 1B of the invention. The second embodiment of a switching system 1B differs from the first embodiment 1A in that the displacement of the transmission 2 is controlled by an electromagnet 38. The switching system 1B of the second embodiment comprises a transmission 2, an electromagnet 38, a hinged member 4a, and a resilient coil spring 10. Switching between the aperture drive system 6 and the zoom drive system 7 is accomplished by the operation switches 311 and the electromagnet 38.

The construction of the transmission 2, the main drive 5, the aperture drive system 6, the zoom drive system 7, the aperture 8, and the imaging system 9 are similar to the first embodiment. The controller 18 must control the driving circuit of the electromagnet 38 is addition to the systems controlled in the first embodiment.

The hinged member 4a of the second embodiment of a switching system 1B is made, at least partly, of a ferromagnetic material. The hinged member 4a comprises a plate spring having at a front end a U-shaped notch. The rear end of the hinged member 4 is swingably mounted on a shaft 13. The hinged member 4a contacts the disk flange 25 of the transmission shaft 21 on either side of the U-shaped notch.

As shown in FIG. 12, the electromagnetic 38 comprises a core 310 (iron core) wound with a coil 39 (cooper wire). The electromagnetic 38 is positioned adjacent to the hinged member 4a, and intermediate the disk flange 25 and the pivot shaft 13, such that a predetermined gap exists between the electromagnet 38 and the hinged member 4a. When the coil 301 of the electromagnet 38 is energized, the core 310 is magnetized and the hinged member is attracted to the electromagnet 38. The operation of the electromagnet 38 is controlled by the controller 18 through a driving circuit shown in FIG. 14. The operation of the motor 52 is controlled by the controller 18, in combination with the electromagnet 38, through a driving circuit shown in FIG. 13.

As shown in FIG. 11, the operation switch 311 comprises a directly operable button-type tele switch 312 for moving the zoom drive system 7 in the telephoto direction, and a directly operable button-type wide switch 313 for moving the zoom drive system in the wide-angle direction. The operation switch 311 also operates to switch the electromagnet 38 on and off. Each of the tele and wide switches 312, 313 is a momentary ON switch. The switches 312, 313 are connected to the controller 18.

When the tele switch 312 is actuated by a user, the controller activates the motor to drive in the telephoto direction and also energizes the electromagnet 38. The hinged member 4a is attracted to the electromagnet 38 and swings about the pivot shaft 13. The disk flange 25 of the transmission shaft 21 and the transmission shaft 21, is urged towards the zoom drive shaft 71 and away from the aperture drive shaft 61.

As in the first embodiment, the transmission shaft 21 is moved away from the aperture drive shaft 21, uncoupling the aperture coupling protrusion 22 and the aperture coupling groove 62. The aperture drive system 6 is thereby disconnected from the transmission 2.

The zoom coupling protrusion 23 of the transmission shaft 21 is brought into contact with the zoom coupling groove 72 of the zoom drive shaft 71, and engaged. If the zoom coupling protrusion 23 and the zoom coupling groove 72 are rotatively aligned, they will be immediately engaged. If the protrusion 23 and groove 72 are not rotatively aligned, the resiliency of the hinged plate spring 4 absorbs the non-engaged length of the protrusion 23 until the protrusion 23 and groove 72 become engaged upon the first half-rotation of the transmission shaft 21.

Figure 13:
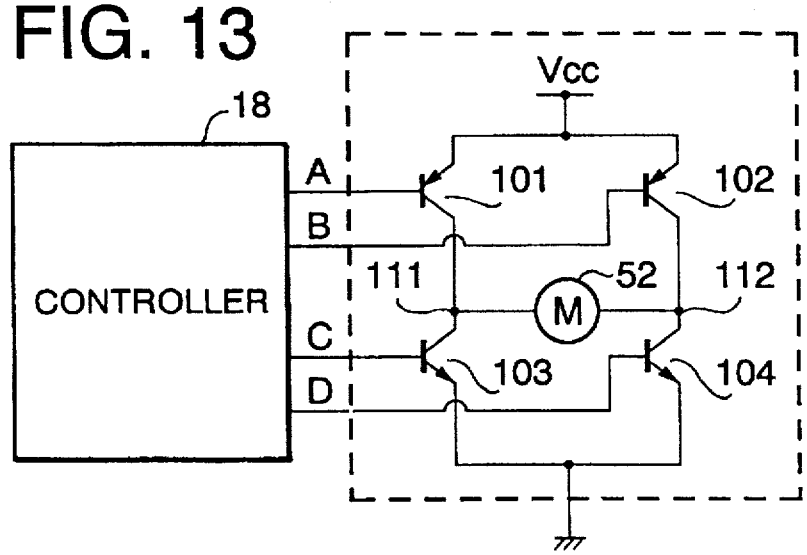
FIG. 13 is a circuit diagram of a motor control circuit according to second and third embodiments of the present invention.
Figure 14:
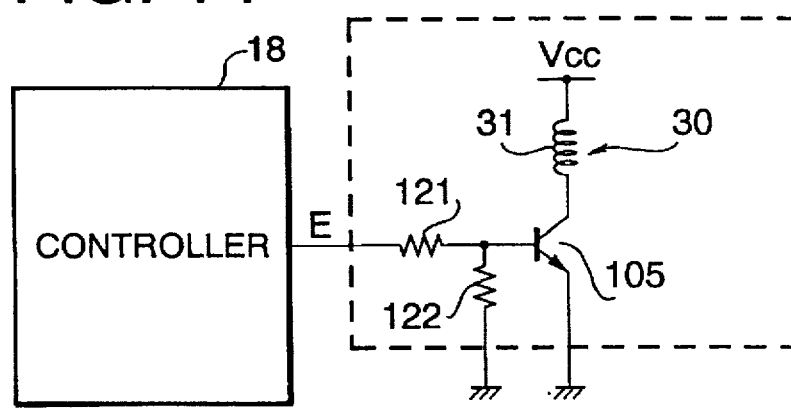
FIG. 14 is a circuit diagram of an electromagnet control circuit according to a second embodiment of the present invention.

FIGS. 13 and 14 show embodiments of driving circuits to control the motor 52 and the electromagnet 38 respectively.

The driving circuit for the motor 52 contains PNP transistors 101 and 102, and NPN transistors 103 and 104. The transistors 101 and 102 are connected to each other by a common emitter. Also, transistors 103 and 104 are connected to each other by a common emitter. The collectors of the transistors 101 and 103 and one terminal of the motor 111 are connected. Similarly, the collectors of the transistors 102 and 104 and the other terminal of the motor 112 are connected. A voltage Vcc is applied to the emitters of transistors 101 and 102, and the emitters of transistors 103 and 104 are grounded. The bases of the transistors 101 to 104 are connected to the controller 18 at outputs A, B, C, and D.

The driving circuit for the electromagnet has a single NPN transistor 105. The voltage Vcc is applied to a terminal of the coil 31 of the electromagnet 38, and the other terminal of the coil 31 is connected to the collector of the transistor 105. The emitter of the transistor 105 is grounded, the base of the transistor 105 is both connected to the output E of the controller 18 through a resistor 121 and grounded through resistor 122.

Table 1 shows the signals sent from the controller 18 through the outputs A, B, C, D, and E, which are connected to transistors 101 to 105 respectively. As shown in Table 1, high level (H) and low level (L) signals may be sent to the outputs A to E and to the transistors 101 to 105. When the tele switch is on, signals of H, L, H, L and H sent to A, B, C, D, and E outputs respectively result in (i) a current flow from 112 terminal to 111 terminal of the motor 52, turning the motor 52 in the telephoto direction and (ii) a current flow from Vcc to transistor 105, energizing the electromagnet 38 and engaging the zoom drive system 7. When the wide switch is on, signals of L, H, L, H, and H sent to A, B, C, D, and E outputs respectively result in (i) a current flow from 111 terminal to 112 terminal of the motor 52, turning the motor 52 in the wide-angle direction and (ii) a current flow from Vcc to transistor 105, energizing the electromagnet 38 and engaging the zoom drive system 7. When the release button is pressed and the aperture must be closed as determined by the controller 18, signals of H, L, H, L, and L sent to A, B, C, D, and E outputs respectively result in (i) a current flow from 112 terminal to 111 terminal of the motor 52, turning the motor 52 in the aperture-closing (the same as telephoto) direction and (ii) no current flow from Vcc, thus the electromagnet 38 is idle and the aperture drive system 6 is engaged. When the release button is pressed and the aperture must be opened, signals of L, H, L, H, L sent to A, B, C, D, and E outputs respectively result in (i) a current flow from 111 terminal to 112 terminal of the motor 52, turning the motor 52 in the aperture-opening (the same as wide-angle) direction and (ii) no current flow from Vcc, thus the electromagnet 38 is idle and the aperture drive system 6 is engaged.

The operation of the aperture drive system 6 in the second embodiment is otherwise similar to the first embodiment, except that if neither of the tele or wide switches is actuated, the electromagnet 38 is not energized by the controller. The flow chart of FIG. 10 also applies to the second embodiment of a switching system. The release switch otherwise operates the AF ranging portion, the photometry measurement portion, the aperture 8 and the imaging system similarly to the first embodiment of switching system.

Although the second embodiment is arranged so that the electromagnet 38 attracts the hinged member 4a, the electromagnet 38 could be arranged on the other side of the hinged member 4a and a permanent magnet fixed to the hinged member 4a, so that the electromagnet 38 would instead repulse the hinged member 4a in a switching direction.

Figure 16:
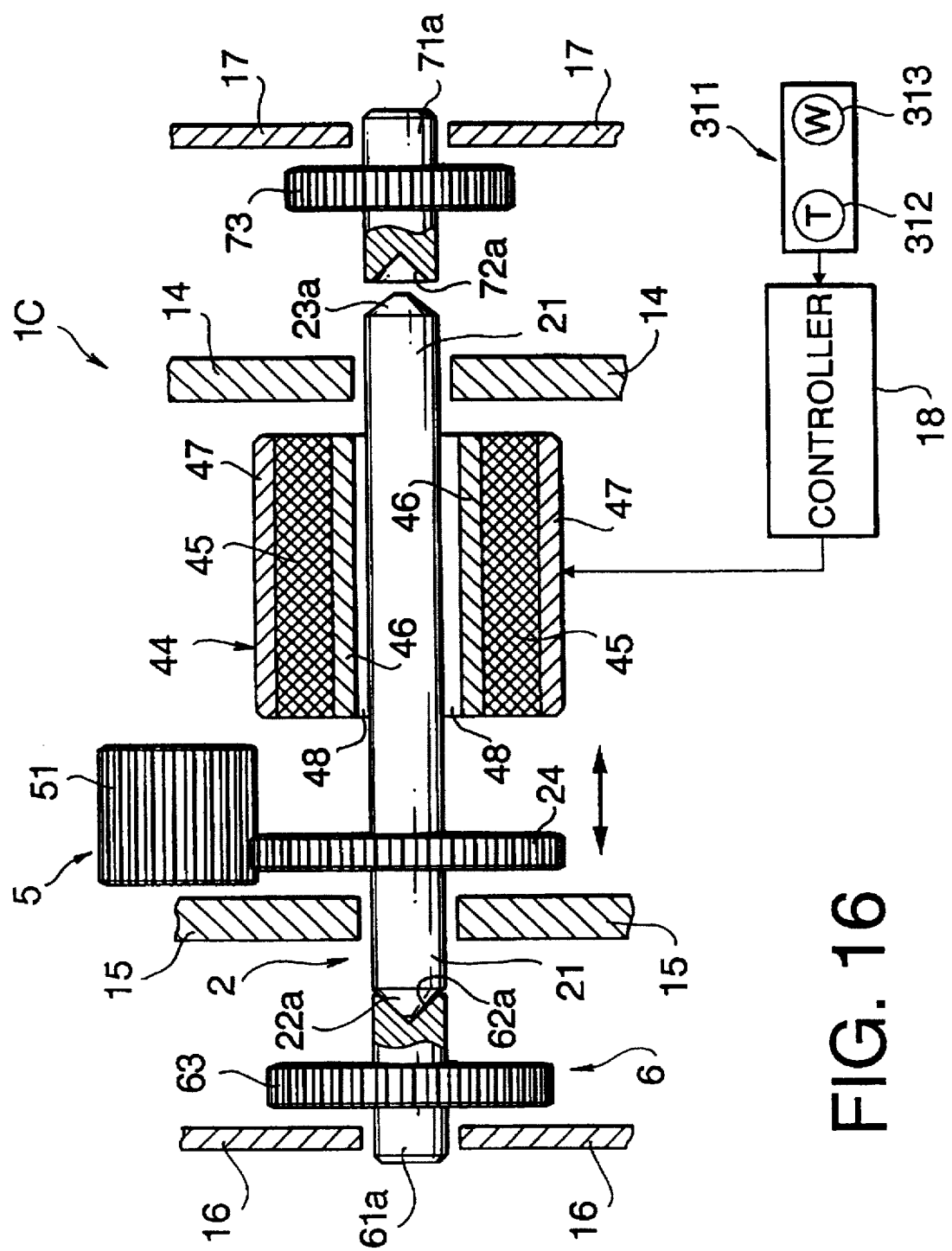
FIG. 16 is a partially cross-sectioned plan view of a third embodiment of a switching system according to the invention, showing a first driving state.

FIG. 16 shows a third embodiment of a switching system 1C of the invention. The third embodiment of a switching system 1C differs from the first or second embodiments 1A or 1B in that the displacement of the transmission 2 is controlled by an solenoid 44. The switching system 1C of the third embodiment comprises a transmission 2 and a solenoid 44. Switching between the aperture drive system 6 and the zoom drive system 7 is accomplished by means of the operation switches 311 and the solenoid 44.

The solenoid 44 surrounds the transmission shaft 21, and moves the transmission shaft 21 to engage and disengage the aperture drive system 6 and the zoom drive system 7. There is no hinged member 4 or 4a as in the first and second embodiments. The coupling protrusions 22a and 23a and coupling grooves 62a and 72a are shaped as cup-cone couplings, and the aperture and zoom drive shafts 61a and 71a, respectively, are permanent magnets. Otherwise, the AF ranging portion, the photometric measuring portion, the aperture drive system 6, and the zoom drive system 7 operate similarly to the second embodiment as descried above. The controller 18 must have more outputs to control the solenoid 44, but the motor control is similar to that of the second embodiment.

Referring to FIG. 16, the solenoid 44 in the switching system 1C includes an iron core 46, a cooper wire wound coil 45, and a cover 47 covering the coil 45. The core 46 is a thick-walled hollow cylinder. The transmission shaft 21 is inserted into a hole 48 through the solenoid 44, and becomes the plunger of the solenoid 44. Furthermore, the aperture coupling protrusion 22a of the transmission shaft 21 is formed in a cone shape. The zoom coupling protrusion 23a and the zoom coupling cup 72a are similarly formed as cone and conic cup shapes, respectively. Thus, the bilateral solenoid magnet is formed, and when the coil 45 of the solenoid 44 is energized with a predetermined polarity, the shaft 21 is urged and moves in one direction (towards the zoom drive shaft 71a). When the solenoid 44 is energized with the opposite polarity, the shaft 21 is urged and moves in the opposite direction (towards the aperture main drive shaft 61a).

As seen in FIG. 16, the aperture main drive shaft 61a comprises, as previously described, a conic-cup shaped aperture coupling cup 62a. The coupling cup 62a is formed to match the corresponding coupling cone 22a of transmission shaft 21. Furthermore, the aperture main drive shaft 61a is formed of a ferromagnetic material, and is permanently magnetically charged such that the south pole is oriented towards the transmission shaft 21. Thus, when the transmission shaft 21, which is also the plunger of solenoid 44, is charged, the shaft 21 will be attracted or repelled by the magnetic charge of the aperture main drive shaft 61a. The attraction or repulsion of the main drive shaft 21 by the magnetic aperture drive shaft 61a adds to the attraction or repulsion exerted by the solenoid coil 41.

The zoom drive shaft 71a is similarly formed to the aperture main drive shaft 61a, as a permanent magnet with a conic-cup coupling cup 62a. The south pole of the zoom drive shaft 61a is also oriented towards the transmission shaft 21. The result of the orientations of the drive shafts 71a and 61a is that when the solenoid is energized and moves the transmission shaft 21 towards one of the drive shafts 71a or 61a and away from the other, the transmission shaft will further be magnetically attracted to the drive shaft that it is moving towards, and repelled by the other.

As shown in FIG. 16, the operation switch 311 is similar to that of the previously described second embodiment, and comprises a directly operable button-type tele switch 312, for moving the zoom drive system 7 in the telephoto direction and a directly operable button-type wide switch 313 for moving the zoom drive system in the wide-angle direction. The operation switch 32a also signals the controller 18 to energize the solenoid 44 with the appropriate polarities. Each of the wide and tele switches 312, 313 is a momentary ON switch. The switches are connected to the controller 18.

When the tele switch 312 is actuated by a user, the controller 18 activates the motor 52 to drive in the telephoto direction, and simultaneously energizes the solenoid 44 with the predetermined polarity, corresponding to the direction of the zoom drive shaft 71. While the tele switch is pressed, the solenoid 44 remains energized. The transmission shaft 21, which is the plunger of the solenoid 44, is urged towards the zoom drive shaft 71a and away from the aperture drive shaft 61. As seen in FIG. 16, the solenoid plunger (transmission shaft 21) is charged in this case with the south pole towards the aperture main drive shaft 61a. The repulsion between the like south poles of the aperture main drive shaft 61a and the transmission shaft 21 adds to the urging of the transmission shaft 21 away from the aperture drive shaft 61a.

The transmission shaft 21 is moved away from the aperture drive shaft 61a and towards the zoom drive shaft 71a, uncoupling the aperture coupling cone 22a and the aperture coupling cup 62a. The aperture drive system 6 is thereby disconnected from the transmission 2.

The zoom coupling cone 23a of the transmission shaft 21 is then brought into contact with the zoom coupling cup 72a of the zoom drive shaft 71, and engaged. The attraction between the opposite south and north poles of the aperture main drive shaft 61a and the transmission shaft 21 respectively adds to the urging of the transmission shaft 21 towards the zoom drive shaft 61, and maintains engagement once they are engaged.

When the wide switch 313 is pressed by the user, the operation of the solenoid 44 and transmission 2 is similar to when the tele switch 312 is pressed, but the motor 52 is controlled to turn in the opposite (wide-angle zooming) direction.

When the release switch is pressed to the second step, the controller 18 charges the solenoid 44 with the opposite polarity, and drives the motor 52 in the direction corresponding to the appropriate aperture setting. The transmission shaft 21 is (i) urged and moved towards the aperture drive shaft 61a by the solenoid 44, (ii) magnetically attracted by the aperture drive shaft 61a, and (iii) magnetically repelled by the zoom drive shaft 71a. Thus, the coupling cone 22a of the transmission shaft 21 comes into contact with the coupling cup 62a of the aperture drive shaft 61a and is held there both by the solenoid 44 and by the magnetic force of the aperture drive shaft 61a.

Figure 17:
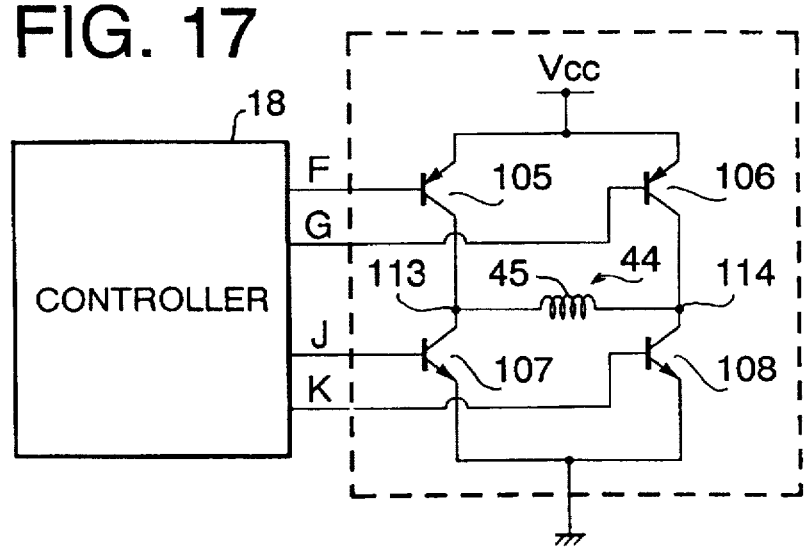
FIG. 17 is a circuit diagram of a solenoid control circuit according to a third embodiment of the present invention.

FIG. 17 shows an embodiment of driving circuits to control the solenoid 44. The motor control circuit is the one previously described and shown in FIG. 13. The driving circuit for the motor 52 is identical to that of the second embodiment. The bases of the transistors 101 to 104 are connected to the controller 18 at outputs A, B, C, and D.

The driving circuit for the solenoid 44 contains PNP transistors 105 and 106, and NPN transistors 107 and 108. The transistors 107 to 108 are connected to each other by emitter grounding. The collectors of the transistors 105 and 107 and one terminal 113 of the solenoid 44 are connected. Similarly, the collectors of the transmissions 106 and 108 and the other terminal 114 of the solenoid 44 are connected. A voltage Vcc is applied to the emitters of transistors 105 and 106, and the emitters of transistors 107 and 108 are grounded. The bases of the transistors 105 to 108 are connected to the controller 18 at outputs F, G, J, and K.

FIG. 18 shows the signals sent from the controller 18 through the outputs A to K, which are connected to transistors 101 to 108 in order. As shown in Table 1, high level (H) and low level (L) signals may be sent to the outputs A to K and thereby to the transistors 101 to 108. When the tele switch is on, signals of H, L, H, L, H, L, H and L sent to A to K outputs respectively result in (i) a current flow from terminal 112 to terminal 111 of the motor 52, turning the motor 52 in the telephoto direction and (ii) a current flow from terminal 114 to terminal 113 of the solenoid, energizing the solenoid 44 in the zoom drive system 7 direction and engaging the zoom drive system 7.

When the wide switch is on, signals of L, H, L, H, H, L, H, and L sent to A to K outputs respectively result in (i) a current flow from 111 terminal to 112 terminal of the motor 52, turning the motor 52 in the wide-angle direction and (ii) a current flow from terminal 114 to terminal 113 of the solenoid, energizing the solenoid 44 in the zoom drive system 7 direction and engaging the zoom drive system 7.

When the release button is pressed and the aperture must be closed as determined by the controller 18, signals of H, L, H, L, L, H, L, and sent to A to K respectively result in (i) a current flow from 112 terminal to 111 terminal of the motor 52, turning the motor 52 in the aperture-closing (the same as telephoto) direction and (ii) a current flow from terminal 113 to terminal 114 of the solenoid, energizing the solenoid 44 in the aperture drive system 6 direction and engaging the aperture drive system 6.

When the release button is pressed and the aperture must be opened, signals of L, H, L, H, L, H, L, and H sent to A to K respectively result in (i) a current flow from 111 terminal to 112 terminal of the motor 52, turning the motor 52 in the aperture-opening (the same as wide-angle) direction and (ii) a current flow from terminal 113 to terminal 114 of the solenoid, energizing the solenoid 44 in the aperture derive system 6 direction and engaging the aperture drive system 6.

The operation of the aperture drive system 6 is otherwise similar to that of the second embodiment, except that if neither of the tele, wide, or release switches is actuated, the solenoid 44 is not energized by the controller 18, and the transmission shaft 21 remains in the last set position, magnetically held either by the zoom drive shaft 71a or the aperture drive shaft 61. The flow chart of FIG. 10 also applies to the third embodiment of a switching system. The release switch otherwise operates the AF ranging subsystem, the photometry subsystem, the aperture 8 and the imaging system similarly to the second described embodiment of a switching system.

The cone shape of the couplings 22a and 23a, when mated to the conic cup shape of the coupling cup 62a and 72a, has the advantages of instant engagement, a more constant magnetic attraction to the cup shape, and the ability to slip in case of motor overload.

In the third embodiment, the transmission shaft 21 selectively connects to one of the aperture drive system 6 or the zoom drive system 7. However, the invention may be alternatively controlled and arranged such that there is a neutral position between the two positions. In this case, when the tele 312, wide 313, and release switches are not actuated, the transmission shaft 21 is in a neutral position and is not connected to either drive system 6 or 7. Furthermore, although the described third embodiment uses a bilateral solenoid, the invention my be alternatively arranged with a one way solenoid or rotary solenoid.

FIGS. 19–25 show a fourth embodiment of a switching system 1D and drive systems 5', 6', 7' of the present invention. In the fourth embodiment, the switching system 1D is able to selectively transmit the motive force of the motor 52 to either of the aperture drive system 6' or the zoom drive system 7'. The fourth embodiment shares the imaging system, AF ranging portion, photometry measurement portion, release switch, tele and wide switches 312 and 313, and recording system of the second and third described embodiments. However, the switching system 1D, the transmission 2', the main drive 5', the aperture drive system 6', the zoom drive system 7', and the aperture 8' are unique to the fourth embodiment. The controller 18 substantially the same to that of the first three embodiments, but is adapted to handle the control requirements of the fourth embodiment.

Figure 19:
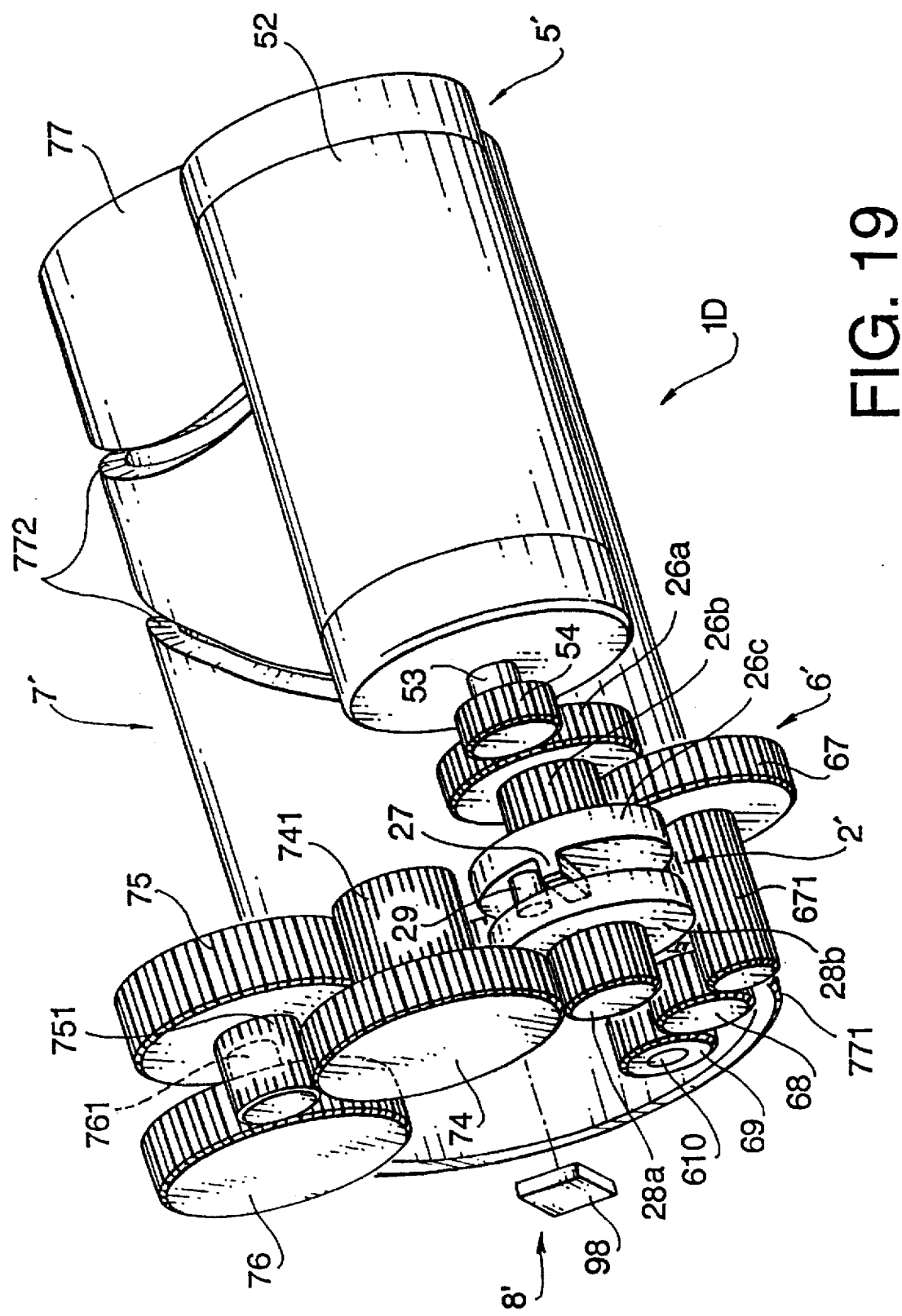
FIG. 19 is a perspective view of a switching system comprising a main drive, a transmission, an aperture drive system and a zoom drive system according to a fourth embodiment of the present invention.

As shown in FIG. 19 the main drive 5' comprises a motor 52, and an output pinion 54 secured to the output shaft 53 of the motor 52. The output pinion 54 drives a gear 26a, which is part of a three-part unitary set of (i) a gear 26a, (ii) a pinion 26b, and (iii) a drive disk 26c.

The transmission 2' transmits the motive force of the main drive 5 to the zoom drive system 7'. The transmission 2' comprises the drive disk 26c and a driven disk 28b opposing each other. A pusher plate 27 is formed on the face of the drive disk 26c, extending from the center of the drive disk 26c in one direction to the circumferential periphery of the drive disk 26c. A driven boss 29 is formed near the rim on the face of the driven disk 28b.

Figure 20:
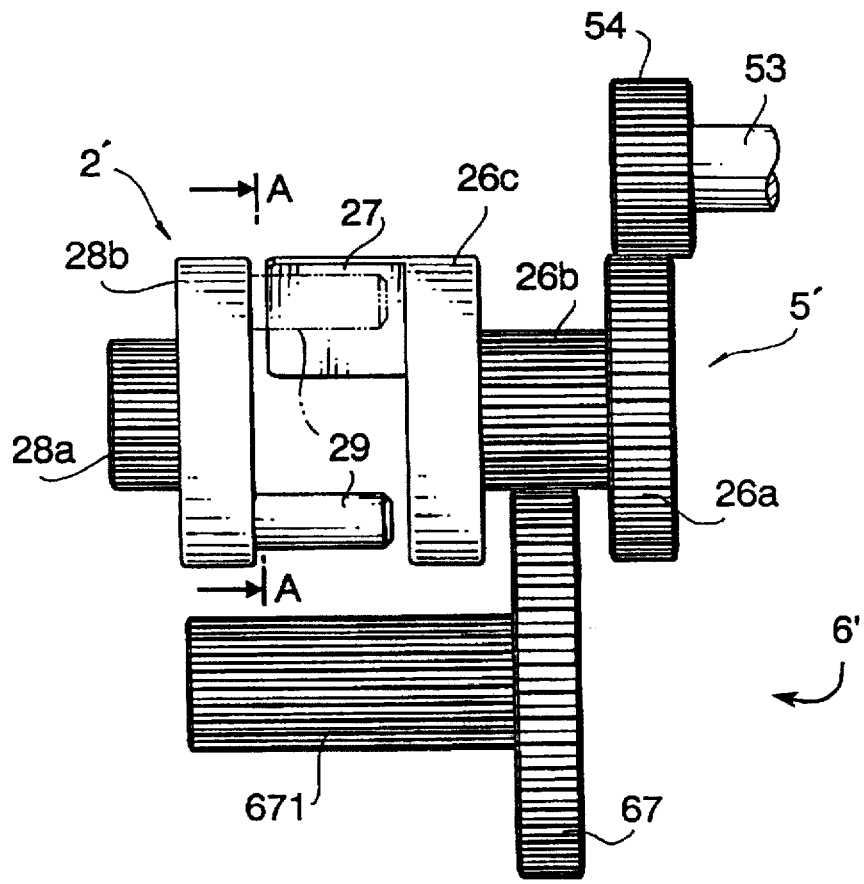
FIG. 20 is a side view showing the relationship of the parts of a transmission according to a fourth embodiment of the present invention.

FIG. 20 shows the relationship of the parts of the transmission 2', the main drive 5', the aperture drive system 6' of the zoom drive system. The drive disk 26c is coaxial and unitary with the pinion 26b, as previously described. The driven disk 28b is coaxial and unitary with a zoom drive pinion 26a. The disks 26c and 28b are separated by a predetermined gap such that the pusher plate 27 and driven boss 29 may interact. A second rotational position of the single driven boss 29 appears as a double-dotted phantom line.

Figure 21:
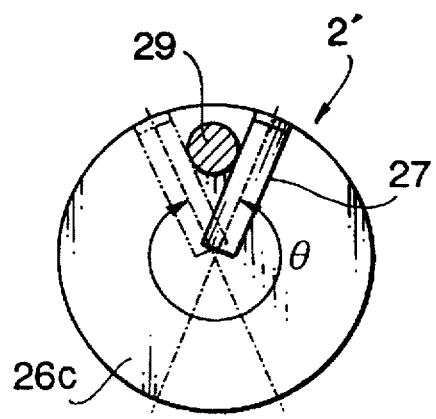
FIG. 21 is a cross-sectional view along the line A—A of FIG. 20 showing a free range of angular play of a drive disk and driven disk of a transmission according to a fourth embodiment of the present invention.

The transmission 2' has a controlled range of free rotational play θ such that the motive force of the main drive 5' may be selectively removed from the zoom drive system 7'. FIG. 21 is a cross-section taken along line A—A of FIG. 20. As shown in FIG. 21, the range of rotational play θ in the transmission is an angular range from the contact point of the pusher plate 27 and boss 29 on one side of the pusher plate 27 (denoted by a solid line in FIG. 21), around to the contact point of the pusher plate 27 and boss 29 on the opposite side of the pusher plate 27 (denoted by a double-dotted line in FIG. 21).

Within the range of rotational play q, the motive force of the drive disk 26c is not transmitted to the disk 28b (and zoom drive system 7'), and the aperture drive system 6' is driven independently of the zoom drive system 7'. That is, the aperture drive system 6' can be driven by the main drive 5' without influencing the zoom drive system 7' throughout the entire range of rotational play q. θ is an angle less than 360°, for example 300°–355°.

The zoom drive system 7' comprises pinion 28a, formed unitarily with a driven disk 28b described later. The pinion 28a drives a gear 74 of a reduction gear train identical to that described in the first three embodiments, comprising three unitary reduction gear and pinion sets: gear 74 and pinion 741, gear 75 and pinion 751, and gear 76 and pinion 761. The pinion 761 finally drives a ring gear 771 formed on the circumference of a cam ring 77. The cam ring 77 comprises a curved cam groove 772 which guides a projection 971 formed on front lens frame 97. The front lens frame is restrained from rotating, but is allowed to move along the optical axis, guided by a first guide shaft 91 and a rotating guide shaft 610, similar to the first three embodiments. When the cam ring is rotated in one direction, the front lens frame 97 is moved in a corresponding direction along the optical axis and is guided by the guide shafts 610 and 91 and by the projection 971. The construction of the zoom drive system 7' is otherwise similar to that of the first three embodiments.

The aperture drive system 6' comprises a reduction unitary gear and pinion set 67 and 671, an intermediate gear 68, and a driven gear 69. The driven gear 69 is fixedly mounted on the rotating guide shaft 610. The reduction gear and pinion 67 and 671 are driven at gear 67 by the pinion 26b, pinion 671 drives intermediate gear 68; and intermediate gear 68 drives the first driven gear 69 and the rotating guide shaft 610. The rotating guide shaft 610 is rotatably mounted inside the cam ring 77, and extends to the aperture 8' region. A linked gear 691 is mounted on the rotating guide shaft 610 in the aperture 8' region, and the linked gear 691 drives (i) an aperture control disk 611 in the aperture 8' region; and (ii) an encoder gear 853 provided to an encoder 85 in the aperture 8' region. The encoder 85 is read by a photo-interruptor 86, and is used by the controller 18 to monitor the rotational position of the aperture control disk 611 and the drive disk 26c.

Figure 22:
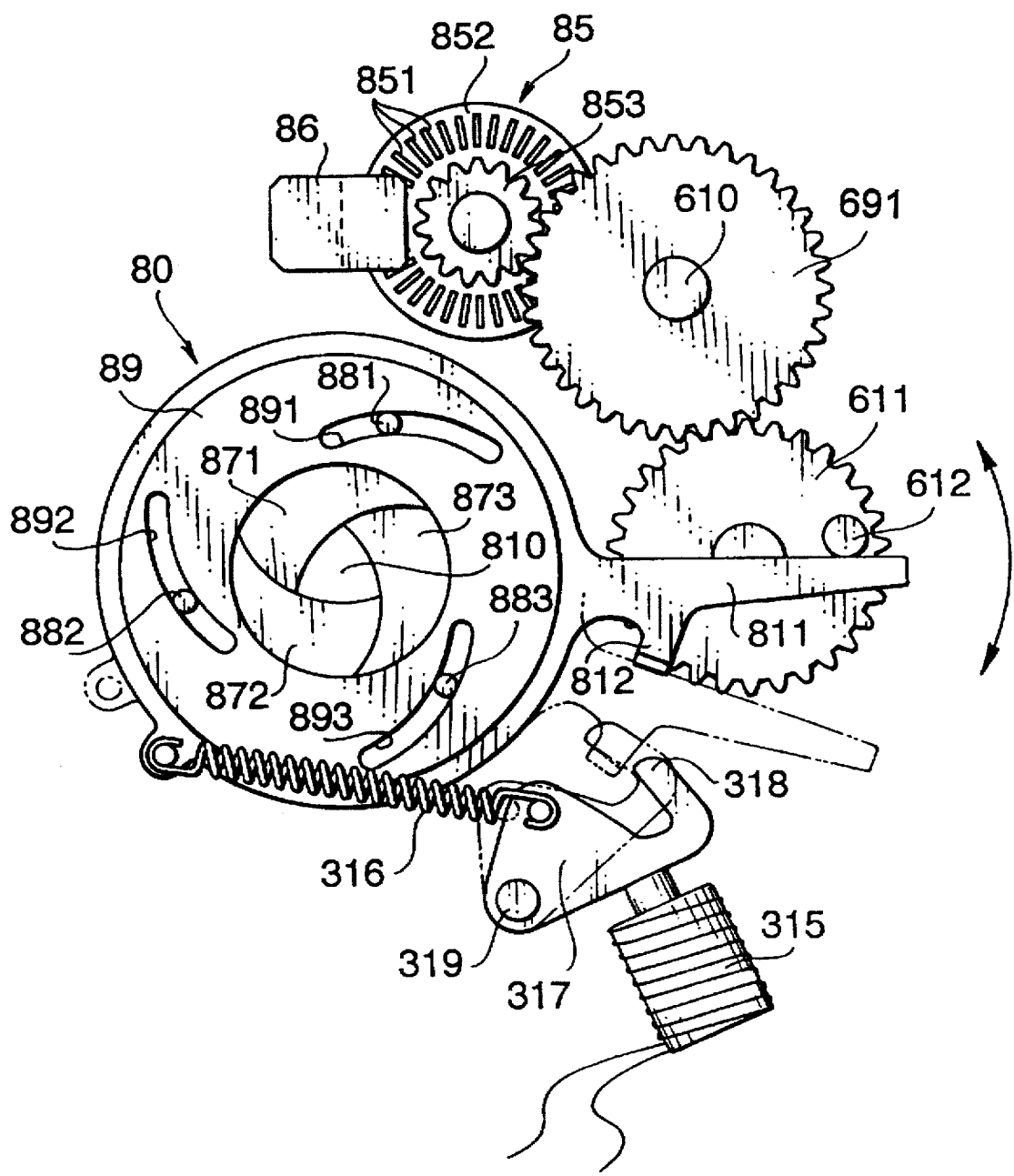
FIG. 22 is a front view of an aperture and switching system according to a fourth embodiment of the present invention.

FIG. 22 is a front view of the aperture 8' of the fourth embodiment of the invention. The aperture 8' comprises three aperture blades 871, 872, and 873, a rotatably supported rotational disk 89, and an aperture control lever 811 extending from the outer edge of the rotation disk 89. The rotation disk 89 comprises a center opening (iris) 810, and three curved guide slots 891, 892, and 893 extending away from the center opening. The curved guide slots 891 to 893 curve in the same direction, and are symmetrically distributed at 120° intervals about the center opening 810. The aperture blades 871, 872 and 873 further comprise guide pins 881, 882, and 883 respectively, and the blades 871 to 873 are mounted movably in the rotation disk 45. The guide pins 881 to 883 are guided by the guide slots 891 to 893 respectively. The rotation of the disk 89 thereby determines the aperture iris 810 size by defining the position of the aperture blades 871 to 873.

The aperture control lever 811 comprises a lever member and a projection 812 extending from an intermediate position on the level member as shown in FIG. 22. The projection has a hooked end, bent up from the plane of the rotation disk 89. A catch 317 is preferably provided in the vicinity of the aperture 8'. The catch 317 is swingably mounted on a shaft 319. The axis of the shaft 319 is parallel with the optical axis of the lens groups, and the catch 317 is therefore swingable in a plane parallel to that of the rotation disk 89.

The catch 317 further comprises a hook 318, for hooking the projection 812 of the aperture control lever 811. The catch 317 is arranged so that the hook 318 can hold the projection 812 when the rotation disk 89 and the aperture control lever 811 are rotated such that the aperture blades 871 to 873 are fully closed.

The aperture 8' further comprises a tension spring 316. The tension spring 316 comprises a coil spring, and has one end secured to the catch 317 and the other end secured to the rotation disk 89. The rotation disk 89 and the catch 317 are both rotatable, and the tension spring 316 is arranged between them such that the rotation disk 89 is urged in the aperture-opening direction. The catch 317 is also urged by the tension spring 316 in a direction such that the hook 318 of the catch 317 holds the projection 812 of the aperture control lever 811 in the aperture-closed position (i.e., the CCD 98 is shielded from light). Therefore, when the aperture control lever 811 and rotation disk 89 are in the aperture-closed position, the catch 317 can hold the lever 811 and the disk 89 in the aperture-closed position even through the lever 811 and disk 89 are urged by the tension spring 316 in the aperture-opening direction.

An electromagnet 315 is preferably mounted near the catch 317 on the opposite side of the catch 317 to the spring 316. The electromagnet 315, when energized, attracts the rotatable catch 317, such that the hook 318 may be released from the projection 812 of the aperture control lever 811, and the rotation disk 89 and the lever 811 may rotate in the aperture-opening direction. The energized (released) position is shown by the solid line in FIG. 22. When the electromagnet 315 is not energized, the catch 317 is urged by the spring 316 in the direction to hold the projection 812 of the aperture control lever 811 as previously described. The positions of catch 317, rotation disk 89, and aperture control lever 811 corresponding to an aperture-closed and held position are shown in FIG. 22 as a double-dotted line.

The aperture control disk 611 further comprises a boss 612. The boss 612 is disposed on the outer rim of the face of the aperture control disk 611, and contacts the aperture control lever 811 when the aperture control lever 811 is not held by the catch 317. The rotation disk 89 and aperture control lever 811 are urged by the tension spring in the aperture-opening direction as described. The aperture-opening direction is towards the aperture control disk 611 and boss 612. The urging of the spring 316 ensures that when the aperture control lever 811 is not held by the catch 317, the boss 612 and the aperture control lever 811 always contact each other, and the size of the aperture iris is therefore strictly defined by the position of the boss 612. Since the position of the boss 612 is defined by the rotational position of the aperture control disk 611, the aperture control lever 811 opens and closes the aperture 8' in a harmonic cycle. The position of the aperture 8' and thereby the size of the aperture iris 810 can be monitored by the controller 18 using the encoder 85 and photo-interruptor 86.

A contact switch (not shown) which is actuated in response to the rotation of the aperture control disk 611 is also disposed in the region of the aperture 8'. When the aperture 8' is in the aperture-closed position, the catch 317 is engaged with the projection 812, and the boss 612 contacts the aperture control lever 811, the contact switch is actuated by an actuator (not shown) provided to the gear 67, and indicates ON to the controller 18. When the catch 317 is engaged with the projection 812, but the boss 612 does not contact the aperture control lever 811, the contact switch is not actuated and indicates OFF to the controller 18.

The rotation of the encoder 85, as detected by the photo interruptor 86, indicates the rotational position of the aperture control disk 611 and the drive disk 26c. The position of the rotation disk 89 and the size of the iris of the aperture 8' are defined by the position of the aperture control disk 611 when the boss 84 and aperture control lever 612 are engaged. The appropriate aperture value is set by the controller 18 based on the measurement taken by the photometry measurement portion.

When the tele switch is pressed, the motor 52 rotates in the determined telephoto direction. The cam ring 77 is rotated at a reduced speed through the main drive 5, the transmission 2', and the zoom drive system 7'. In this case, the rotation of the driven disk 28b does not begin until the pusher plate 27 contacts the boss 29, and the zoom drive system 7' and cam ring only begin to move after contact of the pusher plate 27 with the boss 29.

The rotation of the cam ring 77 moves the front lens frame 97, along the first guide shaft 91 and the rotating guide shaft 610, away from a second lens frame, lengthening the focal length.

The aperture control disk 611 and the encoder 85 are also rotated at a reduced speed through the main drive 5' and the aperture drive system 6'. The main drive 5' and aperture drive system 6' are directly coupled, so that the aperture control disk 611 and encoder 85 are always rotated with the motor 52.

The aperture 8' itself is preferably uncoupled from the aperture drive system 6' when the catch 317 holds the projection 812 of the aperture control lever 811 away from the aperture control disk 611. The aperture 8' is engaged to the aperture drive system 6' when the electromagnet 315 is energized and the catch 317 releases the projection 812, and the aperture control lever 811 is free to move against the boss 612 of the aperture control disk 611. The gear ratios of the aperture drive system are so arranged that one rotation of the aperture control disk 611 corresponds to one rotation of the drive disk 26c.

The rotation of the rotation disk 89 harmonically moves the aperture control lever 811 and thereby opens and closes the aperture 8' iris as previously described. Referring to FIG. 22 as reference for rotational directions, if the aperture 8' is closed when the aperture control disk 611 rotates counter-clockwise, the aperture control lever 811 harmonically follows the boss 612 of the aperture control disk 611 under the urging of the spring 316. In this manner, the rotation disk 89 rotates counter-clockwise (the aperture-opening direction for the rotation disk 89) with the motion of the aperture control lever 811. The aperture is fully opened at a Top Tangent (TT) position of the aperture control disk 611 and boss 612 with reference to the aperture control lever 811, where the tangent contact of the boss 612 and aperture control lever 811 defines the top extreme position of the aperture control lever 811. After the aperture 8' is fully opened, as the aperture control disk 611 continues counter-clockwise, the boss 612 begins harmonically moving the aperture lever 811 down, and the rotation disk 89 moves in a clockwise direction (the aperture-closing direction). The aperture is fully closed at a Bottom Tangent (BT) position of the aperture control disk 611 and boss 612, where the tangent contact of the boss 612 and aperture control lever 811 defines the bottom extreme position of the aperture control lever 811. The angular distance between the TT and BT positions is less of the aperture 8 side of the aperture control disk 611 than on the opposite side. One rotation of the aperture control disk 611 causes one fully closed, fully open, fully closed cycle of the aperture 8'.

Figure 23:
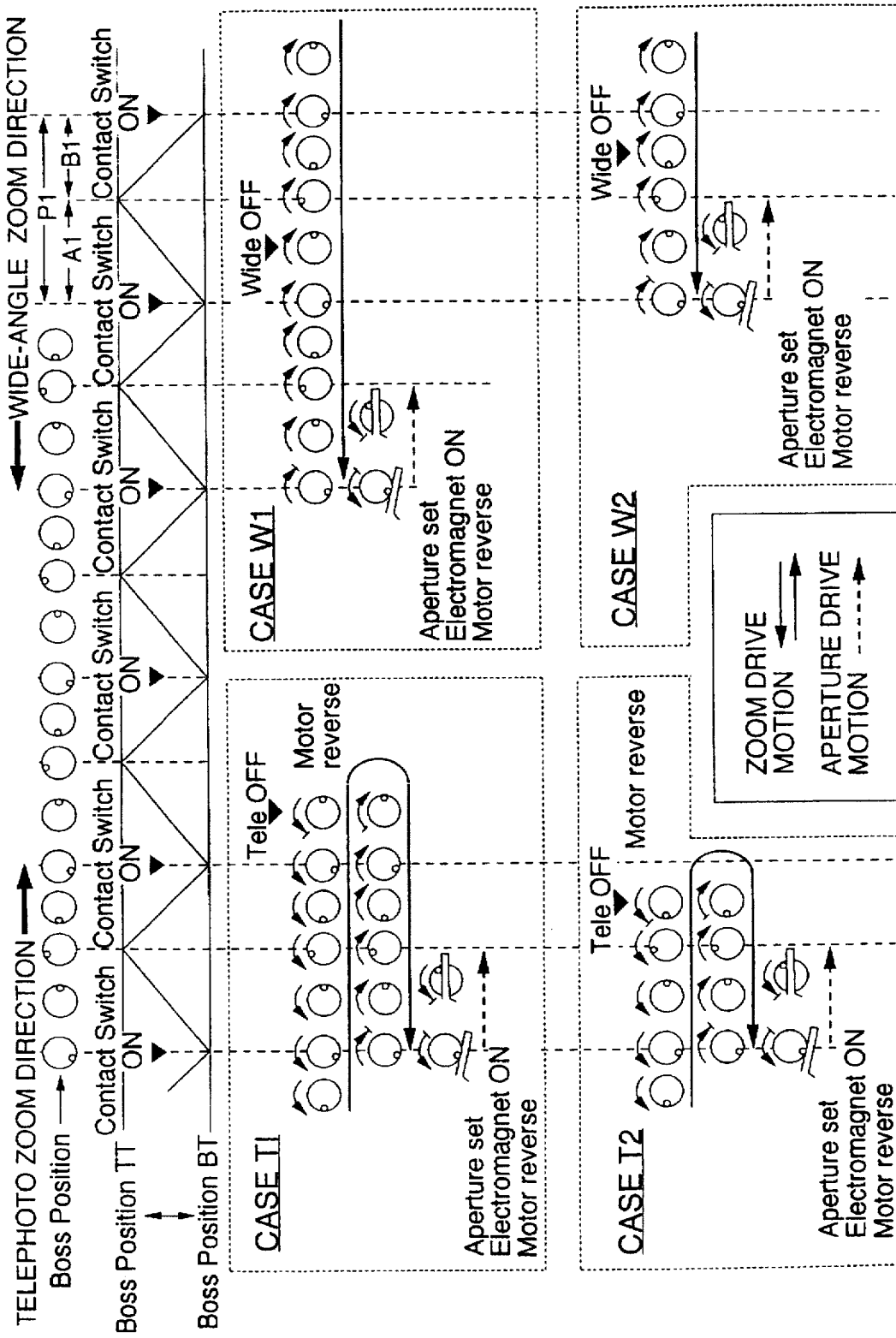
FIG. 23 is a timing chart showing the timing and positional relationships of a switching system and drive system according to a fourth embodiment of the present invention.

FIG. 23 is a timing chart showing an embodiment of a controlling method for the main drive 5', the aperture drive system 6' and the zoom drive system 7'. The "Boss Position" region, with denoted TT and BT positions, specifies the position of the boss 612; at any position of the boss 612, the aperture control lever 811 may or may not be harmonically following the boss 612 depending on the status of the catch 317 (Electromagnet ON as denoted on the timing chart). A1 denotes a half-period; in the telephoto drive direction, it is from BT to TT, and in the wide-angle drive direction, it is from TT to BT. A pulse count A corresponds to a zooming amount along the half-period A1. B1 denotes another half-period; in the telephoto drive direction, it is from TT to BT, and in the wide-angle drive direction, it is from BT to TT. P1 is a full period from BT to TT to BT. A pulse count P corresponds to a zooming amount along the full period P1.

The control methods for balancing the use of the motor between zooming and aperture control are implemented based on the zooming direction, and further based on when the tele or wide switches are released relative to the position of the aperture control disk 611 and drive disk 26c, which rotate in a 1:1 drive ratio. All of the described methods from "Case T1" to "Case W2" begin with the catch 317 engaging the projection 812 of the aperture control lever 811, holding the rotation disk 89 in the aperture-closed position.

"Case T1" indicates a control method for the base that (1) the tele switch is initially ON; (2) the zoom drive system 7' is moving in the telephoto direction; and (3) the tele switch is released when the boss 612 is moving from BT towards TT (in the half-period A1, including TT and BT).

"Case T2" indicates a control method for the case that (1) the tele switch is initially ON; (2) the zoom drive system 7' is moving the telephoto direction; and (3) the tele switch is released when the boss 612 is moving from TT towards BT (in the half-period B1, and not including TT and BT).

"Case W1" indicates a control method for the case that (1) the wide switch is initially ON; (2) the zoom drive system 7' is moving in the wide-angle direction; and (3) the wide switch is released when the boss 612 is moving from TT towards BT (in the half-period A1, including TT and BT).

"Case W2" indicates a control method for the case that (1) the wide switch is initially ON; (2) the zoom drive system 7' is moving in the wide-angle direction; and (3) the wide switch is released when the boss 612 is moving from BT towards TT (in the half-period B1, and not including TT and BT).

It is important to note that the drive disk 26c of the transmission 2' and the aperture control disk 611 rotate simultaneously, and that the full range from BT (aperture closed) to TT (aperture fully open) is less than the range of rotational play θ of the transmission 2'.

The method of "Case T1" begins when the tele switch 312 is pressed and the motor 52 is rotating in the telephoto direction, the catch 317 holding the rotation disk 89 in a aperture closed-position. When the tele switch 312 is released in the period A1, with the boss 612 on the way from BT to TT, the controller 18 stops and reverses the motor 52. The aperture control disk then rotates in the opposite (wide angle) direction, towards BT (aperture-closed position when the catch 317 is not engaged). Meanwhile, the drive disk 26c is turning in the wide-angle direction, but the transmission 2' is not driving the zoom drive system 7', as the pusher plate 27 is moving away from the boss 29. The aperture control disk 611 rotates through BT, TT, and stops at the next BT. Since the motor 52 rotates in excess of the range of play of the transmission 2', the zooming drive system 7' is slightly moved in the wide-angle direction. The large speed (rotations) reduction of the zoom gear system 7' and the relative coarseness of zoom adjustment allows this negligible movement to be ignored. At this point, the electromagnet 315 is energized, and the aperture control lever 811 is released to harmonically follow the boss 612. Beginning at BT (fully closed) of the boss 612, the motor is again reversed, and turns in the telephoto direction. The aperture control disk 611 and boss 612 may not open the aperture 8' to a point between fully closed (BT) and fully open (TT). Meanwhile, the drive disk 26c is free to rotate by at least the range of rotational play θ between the contact points of the pusher plate 27 with either side of the boss 29, without disturbing driven disk 28b and thereby the zoom drive system 7'. The controller rotates the motor 52 until the aperture 8' is set to the determined aperture setting.

In "Case T2", the tele switch 312 is released in the period B1, with the boss 612 on the way from TT to BT. The controller 18 stops and reverses the motor 52. The aperture control disk 611 then rotates in the opposite (wide angle) direction, towards TT (aperture-opened position when the catch 317 is not engaged). meanwhile, the drive disk 26c is turning in the wide-angle direction, but the transmission 2' is not driving the zoom drive system 7', as the pusher plate 27 is moving away from the boss 29. The aperture control disk 611 rotates through TT and stops at the next BT. Since the motor 52 rotates within the range of play of the transmission 2', and the zooming drive system 7' is unaffected. At this point, the electromagnet 315 is energized, and the aperture control lever 811 is released to follow the boss 612. Beginning at BT (fully closed) of the boss 612, the motor is again reversed, and turns in the telephoto direction. The aperture control disk 611 and boss 612 may now open the aperture 8' to a point between fully closed (BT) and fully open (TT). Meanwhile, the drive disk 26c is free to rotate by at least the range of rotational play θ between the contact points of the pusher plate 27 with either side of the boss 29, without disturbing driven disk 28b and thereby the zoom drive system 7'. The controller rotates the motor 52 until the aperture 8' is set to the determined aperture setting.

The method of "Case W1" begins when the wide 313 switch is pressed and the motor 52 is rotating in the wide-angle direction, the catch 317 holding the rotation disk 89 in an aperture closed-position. When the Wide 313 switch is released in the period A1, with the boss 612 on the way from TT to BT, the controller 18 continues rotating the motor 52 in the wide-angle direction, towards BT (aperture-closed position when the catch 317 is not engaged). Meanwhile, the drive disk 26c is driving the zoom drive system 7', but the amount is negligible. The aperture control disk 611 rotates through BT, TT, and stops at the next BT. Since the motor 52 continues to drive the transmission 2', the zooming drive system 7' is slightly moved in the wide-angle direction. The large speed (rotations) reduction of the zoom gear system 7' and the relative coarseness of zoom adjustment allows this negligible movement to be ignored. At this point, the electromagnet 315 is energized, and the aperture control lever 811 is released to harmonically follow the boss 612. Beginning at BT (fully closed) of the boss 612, the motor is reversed, and turns in the telephoto direction. The aperture control disk 611 and boss 612 may now open the aperture 8' to a point between fully closed (BT) and fully open (TT) in some portion oft he angular range between the contact points of the pusher plate 27 with either side of the boss 29 of the disk 611. Meanwhile, the drive disk 26c is free to rotate by at least the range of rotational play 8 between the contact points of the pusher plate 27 with either side of the boss 29, without disturbing driven disk 28b and thereby the zoom drive system 7'. The controller rotates the motor 52 until the aperture 8' is set to the determined aperture setting.

In "Case W2", the wide 313 switch is released in the period B1, with the boss 612 on the way from BT to TT. The controller 18 continues rotating the aperture control disk 46 in the wide angle direction, towards TT (aperture-open position when the catch 317 is not engaged). Meanwhile, the drive disk 26c is driving the zoom drive system 7', as the pusher plate 27 is pushing the boss 29. The aperture control disk 611 rotates through TT and stops at the next BT. Since the motor 52 continues to drive the transmission 2', the zooming drive system 7' is slightly moved in the wide-angle direction. The large speed (rotations) reduction of the zoom gear system 7' and the relative coarseness of zoom adjustment allows this negligible movement to be ignored. At this point, the electromagnet 315 is energized, and the aperture control lever 811 is released to harmonically follow the boss 612. Beginning at BT (fully closed) of the boss 612, the motor is reversed, and turns in the telephoto direction. The aperture control disk 611 and boss 612 may now open the aperture 8' to a point between fully closed (BT) and fully open (TT). Meanwhile, the drive disk 26c is free to rotate by the range of rotational play θ between the contact points of the pusher plate 27 with either side of the boss 29, without disturbing driven disk 28b and thereby the zoom drive system 7'. The controller rotates the motor 52 until the aperture 8' is set to the determined aperture setting.

Figure 24:
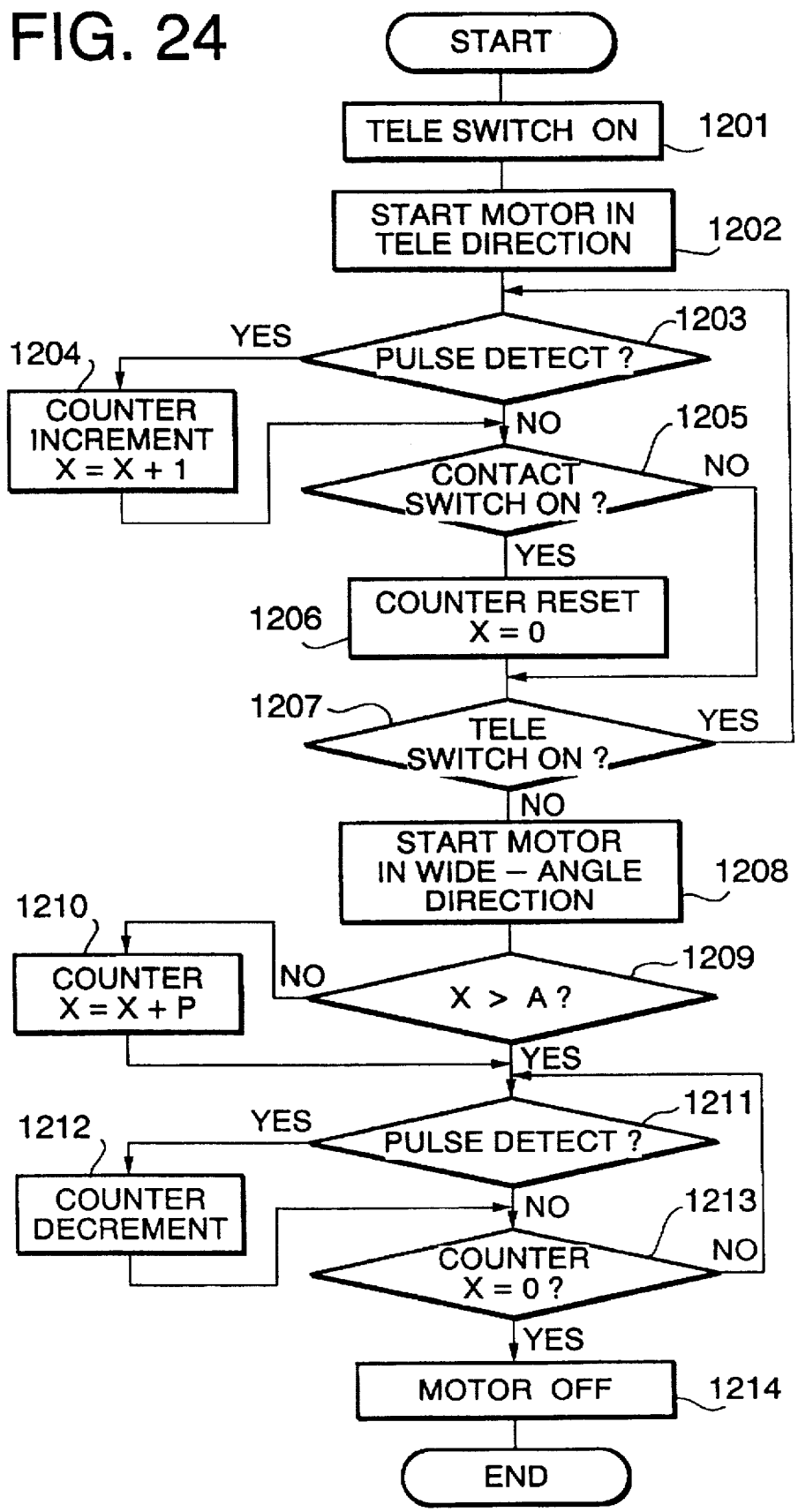
FIG. 24 is a flow chart showing a telephoto zooming operation according to a fourth embodiment of the present invention.
Figure 25:
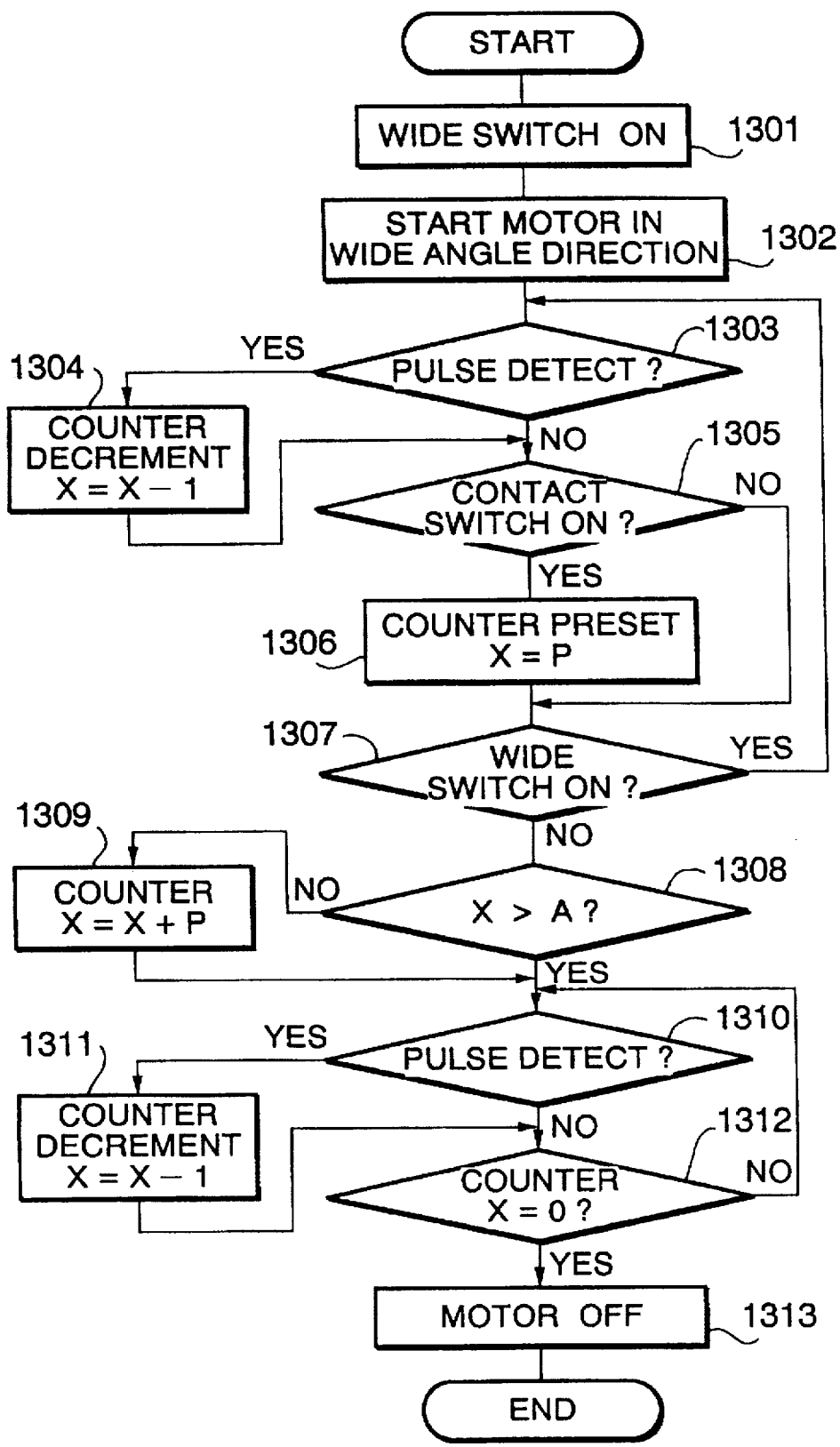
FIG. 25 is a flow chart showing a wide-angle zooming operation according to a fourth embodiment of the present invention.

FIGS. 24 and 25 are flow charts showing the zoom control steps for telephoto and wide angle operation, where A is a number of pulses corresponding to a zooming amount along the half-period A1, and P corresponds to a number of pulses of a zooming amount along the full period P1 as described above.

In order to move the zooming system 7' in the telephoto direction, the photographer activates the tele switch 312 (step 1201), and the motor 52 is energized, rotating in the telephoto direction (step 1202). The controller 18 then checks for a pulse from the photo interruptor 86, (step 1203) and if a pulse is detected, increments the pulse counter X (step 1204).

The controller then checks the contact switch 84 (ON= aperture closed, step 1205), and resets the pulse counter to 0 (step 1206) if the contact switch 84 is ON, but does not reset the pulse counter if the contact switch 84 is off. The tele switch 312 is then checked again, and flow is sent back to the pulse detect step 1203 if the tele switch 312 is still ON (step 1207). Steps 1203 to 1207 are performed repeatedly until the tele switch 312 is OFF.

When the tele switch 312 is found to be OFF in step 1207, the motor 52 is reversed, and rotates in the wide angle direction (step 1208). To check if the switch 312 was released in the interval A1 or B1, the pulse counter X is compared to A. If X is found to be less than or equal to A in step 1209, then the switch 312 was released in A1, and X is replaced by X+P (step 1210). If X is greater than A, then the switch 312 was released in B1, and the counter X is left unchanged. The photo interruptor is then checked again for a pulse in step 1211.

if a pulse is detected in step 1211, the counter X is decremented (step 1212) by one. The counter X is then checked to see if it has reached 0 in step 1213. If the counter X is not 0, flow is sent back to the pulse detect step 1211, and the controller 18 loops between 1211 and 1213 until the pulse counter X reaches 0. The motor 52 will have turned the aperture drive system 6' through an aperture opening position at TT at least once. The motor 52 is then stopped at step 1214, ending the telephoto zooming procedure.

In order to move the zooming system 7' in the wide-angle direction, the photographer activates the wide switch 313

(step 1301), and the motor 52 is energized, rotating in the wide-angle direction (step 1302). The controller 18 then checks for a pulse from the photo interruptor 86, (step 1303) and if a pulse is detected, decrements the pulse counter X (step 1304).

The controller then checks the contact switch 84 (ON= aperture closed, step 1305), and presets the pulse counter to P (step 1306) if the contact switch 84 is ON, but does not preset the pulse counter if the contact switch 84 is OFF. The wide switch 313 is then checked again, and flow is sent back to the pulse detect step 1303 if the wide switch 313 is still ON (step 1307). Steps 1303 to 1307 are performed repeatedly until the Wide switch 313 is OFF.

After the wide switch 313 is found to be OFF in step 1307, to check if the switch 313 was released in the interval A1 or B1, the pulse counter X is compared to A. If X is found to be less than or equal to A in step 1308, then the switch 313 was released in A1, and X is replaced by X+P (step 1309). If X is greater than A, then the switch 313 was released in B1, and the counter X is left unchanged. The photo interruptor is then checked again for a pulse in step 1310.

If a pulse is detected in step 1310, the counter X is decremented (step 1311) by one. The counter X is then checked to see if it has reached 0 in step 1312. If the counter X is not 0, flow is sent back to the pulse detect step 1310, and the controller 18 loops between 1310 and 1312 until the pulse counter X reaches 0. The motor 52 will have turned the aperture drive system 6' through an aperture opening position at TT at least once. The motor 52 is then stopped at step 1313, ending the wide-angle zooming procedure.

The flow chart of FIG. 10 applies to the aperture control of the fourth embodiment of a switching system of the present invention. The operation of the tele and wide switches 312 and 313, the release switch, the photometry measurement portion, the AF ranging, and the imaging system 9 is similar to the first three embodiments.

The switching system 10 of the fourth embodiment of the present invention is able to selectively transmit the motive force of a motor 52 to either of an aperture 8' or a zoom drive system 7'. As described above, since the switching system of the invention includes the transmission portion 2' having a play, and operates the aperture drive system 6' and zoom drive system 7' by one driving system, the number of parts and motors necessary to operate the camera is therefore lower, and the camera may be more easily miniaturized or lowered in cost.

Furthermore, in the fourth embodiment of a switching system, after either switch tele 312 or wide 313 is released and the aperture is set, the rotation of the motor 52 and of the aperture drive system 6' is in the same direction (the telephoto direction) among all the described control method "Cases", so compensation for the aperture drive system 6' backlash is made simpler.

In the fourth embodiment, the play θ of the drive disk 26c equals an angle from an open aperture position to the next open aperture position and θ=2P, the invention is not limited to this specific ratio and θ may be P, 3P, 4P, etc. θ can be modified by, for example, changing gear ratios.

Further, in the fourth embodiment, after a zooming switch is released the motor 52 is arranged to drive through the fully open aperture (TT) position and to stop at the closed aperture position (BT). However, the invention is not limited to this operation and the motor 52 may be arranged to, for example, drive through the closed aperture position (BT) and to stop at the fully open aperture position (TT). Yet further, the motor 52 may be arranged to, for example, drive through the closed or fully opened aperture position two times or more and to stop at the next closed or fully open aperture position. Alternatively, the motor 52 may be arranged to stop at other point than the closed and fully opened aperture position after a zooming switch is released. In this case, the motor 52 can be arranged to, for example, drive by a determined angle after the zooming switch is turned off.

Although in the fourth embodiment, and in case T1, T2, W1, and W2 as shown in FIG. 5, the motor 52 is arranged to rotate in the direction to move the zoom drive system 7' in the wide angle direction after a zooming switch is released, the invention is not limited to this operation and the motor 52 may rotate in the direction to move the zooming drive system 7' in the telephoto direction in any of cases T1, T2, W1, or W2. Furthermore, the motor 52 may be arranged to select a wide-angle or telephoto rotating direction after a zooming switch is released according to the cases T1, T2, W1, or W2.

Yet further, although in the fourth embodiment, the motor 52 is arranged to rotate by a determined amount, the invention is not limited to this operation, and the motor 52 can be arranged, for example, to stop after a zooming switch is released and to reverse and rotate within the range of the play of the transmission 2', in order to operate the aperture drive system 6'. The invention may be of any construction, that allows the aperture 8' operate properly within the range of the play θ of the transmission 2'. The angle of play θ of the transmission 2' of the fourth embodiment is set to almost 360° but it may be any value below 360°.

Yet still further, although the aperture drive system 6' of the fourth embodiment is directly connected to the main drive 5', it may be indirectly connected to the main drive 5'. In another variation of the fourth embodiment, the aperture 8' moves according to the movement of the aperture lever 811, as the boss position locus shown in FIG. 23, instead of having a means for keeping the aperture 8' closed.

Although in the second to fourth embodiments, the operating portion consists of button-type switches 312 and 313, the operating portion may be a slidable or rotational member, or any other switch-type device, for switching the tele and wide switches on or off.

Although the described embodiments have the aperture drive system as the first working system and the zoom drive system as the second working system, the invention may be alternatively arranged to have the positions of the described working systems reversed.

The described embodiments include a CCD 98 and built-in recorder in the imaging system, but the invention may alternatively used with color or b/w photographic film, or a separate recording system.

The switching system of the invention may be applied to a compact camera, a single-lens reflex camera, a video camera, a digital still camera, or any imaging device that has motor-driven aperture and zooming systems.

Though the embodiments have an automatic focusing system, the invention may be applied to a camera with a manual focusing system.

The switching systems of the embodiments of the present invention are able to selectively transmit the motive force of a motor to either of an aperture drive system or a zoom drive system. The number of parts and motors necessary to operate the camera is, and the camera may be more easily miniaturized or lowered in cost. Furthermore, the structure is simple and assembly and testing is therefore easier. The combined operation switch/lever and transmission switching system results in a reduced number of steps to accomplish the transmission switching and zoom operation.

the present disclosure relates to a subject matter contained in Japanese Patent Applications No. HEI 5-247363, filed Sep. 7, 1993; No. HEI 5-247364, filed Sep. 7, 1993; No. HEI 5-247365, filed on Sep. 7, 1993; and No. HEI 5-257759, filed on Sep. 21, 1993 which are expressly incorporated herein in their entireties.

What is claimed is:

1. A switching system for a camera, said switching system comprising:
   a main drive, comprising a motor, for transmitting a motive force of said motor in forward and reverse rotational directions;
   a zoom drive system for transmitting said motive force to a zoom lens group to move said zoom lens group in wide-angle and telephoto directions;
   an aperture drive system for transmitting said motive force to an aperture to open and close said aperture;
   a transmission, coupled to said main drive, for selectively transmitting said motive force of said motor to said zoom drive system and said aperture drive system; and
   switching means for applying a force to said transmission to switch said transmission between transmitting said motive force to said zoom drive system and to said aperture drive system, wherein said transmission comprises:
      a first shaft that moves linearly along a longitudinal axis of said first shaft, said first shaft having a first engaging portion at one distal end of said first shaft and a second engaging portion at an other distal end of said first shaft;
   said aperture drive system comprising:
      a second shaft coaxially aligned with said first shaft and having a third engaging portion at one distal end of said second shaft,
   said zoom drive system comprising:
      a third shaft coaxially aligned with said first shaft and having a fourth engaging portion at one distal end of said third shaft, said first shaft moving linearly to engage one of said first engaging portion and said second engaging portion with one of said third engaging portion and said fourth engaging portion, respectively, when said transmission is switched, said first engaging portion and said third engaging portion engaging to transmit said motive force transmitted by said transmission to said aperture of said camera to open and close said aperture, and wherein said second engaging portion and said fourth engaging portion engage to transmit said motive force transmitted by said transmission to said zoom drive system of said camera to move said lens zoom group in telephoto and wide-angle zooming directions.

2. The switching system according to claim 1,
said switching means comprises a movable switching member, and selective transmitting of motive force by said transmission is associated with a movement of said movable switching member.

3. The switching system according to claim 2,
said motor is started and stopped in association with said movement of said switching member.

4. The switching system according to claim 2,
said motor is started and stopped to position said zoom lens group in a telephoto and a wide-angle zooming portions by movement in first and second rotational directions, said starting and stopping actuated by said movement of said switching member.

5. The switching system according to claim 2,
said movement of said switching member is a sliding movement.

6. The switching system according to claim 2,
said movable switching member comprising a push-button switch, said movement of said push-button being actuated by a push.

7. The switching system according to claim 1,
wherein said switching means connects said transmission to said aperture drive system when said switching means is in a neutral state, said switching means connecting said transmission to said zoom drive system when said switching means is activated.

8. The switching system according to claim 1, further comprising:
resilient means, for biasing said transmission towards said aperture drive system.

9. The switching system according to claim 8,
said transmission is connected in a neutral state to said aperture drive system, and is selectively connected to said zoom drive system when said switching means is switched against said bias of said resilient means.

10. The switching system according to claim 1,
said engaging portions are formed on facing surfaces of said distal ends of said shafts.

11. The switching system according to claim 1,
said switching means comprising:
   an electromagnet;
   a pushing member for selectively pushing said first shaft towards said third shaft of said zoom drive system; and
said electromagnet acts on said pushing member to selectively switching said transmission between said aperture drive system and said zoom drive system.

12. The switching system according to claim 1,
said switching means comprising:
   a solenoid for selectively pushing said first shaft towards said second shaft of said aperture drive system or said third shaft of said zoom drive system;
   wherein said first shaft is made of a ferromagnetic material, and comprises a plunger of said solenoid; and
   said solenoid acts on said first shaft to selectively switch said transmission between said aperture drive system and said zoom drive system.

13. The switching system according to claim 12,
said first engaging portion and said second engaging portion are cone-shaped; and
said third engaging portion and said fourth engaging portion are conically cup-shaped.

14. The switching system according to claim 12,
said second shaft and said third shaft are permanent magnets;
said first shaft is held by a magnetic force of said second shaft when said transmission is switched to a position where said first shaft and second shaft are engaged; and
said first shaft is held by a magnetic force of said third shaft, when said transmission is switched to a position where said first shaft and said third shaft are engaged.

15. A switching system for a camera, said switching system comprising:
   a main drive, comprising a motor and means for transmitting a motive force of said motor;
   an aperture for opening and closing;
   an aperture drive system for transmitting said motive force of said motor to said aperture to open and close said aperture;

a zoom lens group for moving in wide-angle and telephoto directions;

a zoom drive system for transmitting said motive force of said motor at least to said zoom lens group to move said zoom lens group in telephoto and wide-angle directions; and a transmission, coupled to said main drive, for selectively applying said motive force of said main drive to said zoom drive system, wherein said transmission and said aperture drive system sequentially apply said motive force of said main drive to said zoom drive system and to said aperture respectively, said transmission comprising a drive portion and a driven portion, said drive portion and said driven portion being engaged to transmit said motive force of said drive portion to said driven portion, said engagement between said drive portion and said driven portion having a predetermined range of play within which said driven portion is free of the motive force of said drive portion, said driven portion being driven by a plurality of rotations in one of two directions to drive said zoom drive system, while being driven by less than one rotation in one of said two directions to drive said aperture drive system.

16. The switching system according to claim 15, wherein said motive force of said main drive is only transmitted to said zoom drive system by said transmission when said driven portion is outside of said predetermined range of play of said engagement between said drive portion and said driven portion.

17. The switching system according to claim 16, said motive force of said main drive system is transmitted to said zoom drive system when said driven portion is outside of said predetermined range of play of said engagement; and said motive force of said main drive system is transmitted to said aperture by said aperture drive system when said drive portion is within said predetermined range of play of said engagement.

18. The switching system according to claim 16, further comprising:

control means for activating and controlling said motor; and said control means monitors a relationship between said aperture drive system and said predetermined range of play of said engagement between said drive portion and said driven portion.

19. The switching system according to claim 18, said control means rotates said motor in a predetermined direction and controls said motor to rotate by a predetermined amount in response to said monitored relationship between said aperture drive system and said predetermined range of play of said engagement between said drive portion and said driven portion.

20. The switching system according to claim 19, said predetermined amount is a number of rotations of said aperture drive system to rotate to an aperture-closing position after rotating at least once to a position where said aperture is fully open.

21. The switching system according to claim 20, said predetermined direction is a wide-angle zooming direction of said zoom drive system.

22. The switching system according to claim 18, said control means further comprises an operating switch comprising a movable switching member, and said activating and controlling of said motor is associated with a movement of said movable switching member.

23. The switching system according to claim 22, said motor is started and stopped in association with said movement of said switching member.

24. The switching system according to claim 23, said motor is started and stopped to position said zoom lens group in said telephoto and said wide-angle positions by movement in first and second zooming rotational directions, said starting and stopping with said movement of said switching member.

25. The switching system according to claim 24, said movement of said switching member is a sliding movement.

26. The switching system according to claim 25, said switching member comprises a push-button switch, and said movement of said push-button switch is activated by a push.

27. The switching system according to claim 16, said switching means further comprising:

switching means; and means for applying and removing a motive force of said aperture drive system to and from said aperture, said means for applying and removing a motive force of said aperture drive system being switchable by said switching means.

28. The switching system according to claim 27, said motive force of said main drive system is transmitted to said zoom drive system when
  (a) said driven portion is outside of said predetermined range of play of said engagement, and
  (b) said switching means switches said means for applying and removing said motive force of said aperture drive system to remove said motive force of said aperture drive system from said aperture; and said motive force of said main drive system is transmitted to said aperture by said aperture drive system when
  (a) said drive portion is within said predetermined range of play of said engagement, and
  (b) said switching means switches said means for applying and removing said motive force of said aperture drive system to apply said motive force of said aperture drive system to said aperture.

29. The switching system according to claim 28, further comprising:

control means for activating and controlling said motor; and said control means monitors a relationship between said aperture drive system and said predetermined range of play of said engagement between said drive portion and said driven portion.

30. The switching system according to claim 29, said control means rotates said motor in a predetermined direction and controls said motor to rotate by a predetermined amount in response to said monitored relationship between said aperture drive system and said predetermined range of play of said engagement between said drive portion and said driven portion.

31. The switching system according to claim 30, said predetermined amount is a number of rotations of said aperture drive system to rotate to an aperture-closing position after rotating at least once to a position where said aperture is fully open.

32. The switching system according to claim 31, said predetermined direction is a wide-angle zooming direction of said zoom drive system.

33. The switching system according to claim 16,
said drive portion comprises a first rotating member having a first range of rotation;
said driven portion comprises a second rotating member having a second range of rotation;
said first rotating member and said second rotating member engage each other at a sub-range of engagement within a predetermined range of interaction of said first range of rotation and said second range of rotation; and
said predetermined range of play is defined by a portion of said predetermined range of interaction outside said sub-range of engagement.

34. The switching system according to claim 33,
said first rotating member further comprises a first projection; and
said second rotating member further comprises a second projection; and
said first rotating member and said second rotating member engage each other at contacting surfaces of said first projection and said second projection.

35. The switching system according to claim 34,
an axis of rotation of said first rotating member and an axis of rotation of said second rotating member are coaxial;
said first rotating member and said second rotating member are each substantially disk-shaped;
a face of said first rotating member and a face of said second rotating member oppose each other; and
said first projection and said second projection contact each other at an interval between said opposing faces of said first rotating member and of said second rotating member.

36. The switching system according to claim 35, one of said first or second projections is a cylindrical boss projecting from said face of said corresponding first or second substantially disk-shaped rotating member, and adjacent to a rim of said corresponding first or second substantially disk-shaped first rotating member.

37. The switching system according to claim 35, a remaining one of said first or second projections is a plate-shaped protrusion projecting from said face of said corresponding first or second substantially disk-shaped rotating member, and extending from said axis of rotation of said corresponding first or second substantially disk-shaped rotating member to a rim of said corresponding first or second substantially disk-shaped rotating member.

38. The switching system according to claim 15, said switching system further comprising:
means for holding said aperture in a closed position.

39. A method of switching a motive force of a main drive to a zoom drive system and to an aperture in a camera, which comprises the steps of:
(a) monitoring an angular position of a rotating drive member of said main drive, said rotating drive member being directly coupled with a whole number drive ratio to an aperture drive system for operating said aperture, and said rotating drive member further drives said zoom drive system at either of one of a first and second contact points, a first rotating direction of said rotating drive member being away from said second contact point and towards said first contact point, and a second rotating direction of said rotating drive member being away from said first contact point and towards said second contact point;
(b) driving said rotating drive member and said aperture drive system in said first rotating direction by an angular amount of at least the angular range from said first contact point to said second contact point, to a first predetermined angular position corresponding to a minimum possible aperture size of said aperture;
(c) detecting a depression of a release switch;
(d) setting an aperture size variable to a value between said minimum possible aperture size and a maximum possible aperture size of said aperture; and
(e) driving said rotating drive member, and said aperture drive system, in said second rotating direction, to a variable angular position of said rotating drive member corresponding to said set value of said aperture size variable,
an angular range in said second rotating direction, from said first predetermined angular position to a second predetermined angular position corresponding to said maximum possible aperture size, is equal to or less than an angular range, in said second rotating direction, from said first contact point to said second contact point.

40. The method of switching a motive force of a main drive to a zoom drive system and to an aperture drive system according to claim 39,
said minimum possible aperture size corresponds to a fully closed aperture, and
said maximum possible aperture size corresponds to a fully open aperture.

41. The method of switching a motive force of a main drive to a zoom drive system and to an aperture drive system according to claim 39, further comprising the steps of:
(a') disconnecting said aperture from said aperture drive system while holding said aperture closed; and
(e) connecting said aperture to said aperture drive system while releasing said aperture to open,
said disconnecting step precedes said monitoring step, and
said connecting step immediately follows said setting step.

42. A switching system for a camera, the switching system comprising:
a release switch;
a main drive comprising a rotating drive member;
an aperture drive system directly coupled with a whole number drive ratio to said main drive for operating an aperture;
a zoom drive system driven by said rotating drive member at either one of a first and second contact points, a first rotating direction of said rotating drive member being away from said second contact point and towards said first contact point, and a second rotating direction of said rotating drive member being away from said first contact point and towards said second contact point; and
a controller for:
(a) monitoring the angular position of said rotating drive member,
(b) activating said main drive to drive said rotating drive member and said aperture drive system in said first rotating direction by an angular amount of at least the angular range from said first contact point to said second contact point, to a first predetermined angular position corresponding to a minimum possible aperture size of said aperture,
(c) detecting a depression of said release switch, (d) setting a variable aperture size to a value between said minimum possible aperture size and a maximum possible aperture size of said aperture, and (e) activating said main drive to drive said rotating drive member, and said aperture drive system, in said second rotating direction, to a variable angular position of said rotating drive member corresponding to said set value of said variable aperture size of said aperture, an angular range in said second rotating direction, from said first predetermined angular position to a second predetermined angular position corresponding to said maximum possible aperture size, is equal to or less than an angular range, in said second rotating direction, from said first contact point to said second contact point.

43. The switching system for a camera according to claim 42, said minimum possible aperture size corresponds to a fully closed aperture; and said maximum possible aperture size corresponds to a fully open aperture.

44. The switching system for a camera according to claim 42, further comprising:

means for disconnecting said aperture from said aperture drive system; and means for holding said aperture closed, and said controller further (a') activates said disconnecting means to disconnect said aperture from said aperture drive system while activating said holding means to hold said aperture closed, and (e) connects said aperture to said aperture drive system, and said controller activates said disconnecting means and said holding means at a time preceding said monitoring of said angular position of said rotating drive member, and said controller deactivates said disconnecting means and said holding means immediately following said setting of a variable aperture value of said aperture between said minimum possible aperture value and a maximum possible aperture value of said aperture.

45. The switching system of claim 15, wherein said zoom drive system moves said zoom lens group along an optical axis direction.

46. The switching system of claim 15, wherein said transmission does not move to an initial predetermined position to drive said zoom drive system and said aperture drive system when said transmission switches the application of said motive force between said zoom drive system and said aperture drive system.

47. A switching system for a camera, comprising:

a main drive, comprising:

a motor; and means for transmitting a motive force of said motor;

an aperture for opening and closing;

an aperture drive system that transmits said motive force of said motor to said aperture to open and close said aperture;

a zoom lens group that moves in a wide-angle direction and a telephoto direction;

a zoom drive system that transmits said motive force of said motor at least to said zoom lens group to move said zoom lens group in said telephoto direction and said wide-angle direction; and a transmission, coupled to said main drive, for selectively applying said motive force of said main drive to said zoom drive system and said aperture drive system without returning to a system-wide initial position when said transmission switches the application of said motive force between said zoom drive system and said aperture drive system, said zoom drive system being driven in a first rotational direction to drive said zoom lens group in said wide-angle direction, said zoom drive system being driven in a second rotational direction to drive said zoom lens group in said telephoto direction, said aperture drive system being driven in one of said first and second rotational directions to control said aperture.

48. A switching system for controlling a zoom lens and an aperture of a camera, comprising:

a motor;

an aperture drive system that transmits a motive force of said motor to the aperture;

a zoom drive system that transmits said motive force of said motor to the zoom lens; and a transmission that selectively applies said motive force of said motor to said zoom drive system and to said aperture drive system, wherein said zoom drive system is driven in two directions by said transmission to control a zooming operation of the zoom lens, and said aperture drive system is driven in one of said two directions by said transmission to control an operation of the aperture, said transmission having a range of play sufficient for controlling said aperture without substantially changing a position of the zoom lens, said transmission performing a predetermined operation to create said predetermined range of play, said zoom drive system having a first drive ratio and said aperture drive system having a second drive ratio that differs from said first drive ratio so that said predetermined operation performed by said transmission to create said predetermined range of play causes substantially no change in said position of the zoom lens.

49. The switching system of claim 48, wherein said transmission comprises:

a drive portion; and a driven portion, said drive portion and said driven portion being engaged to transmit said motive force to said driven portion, an engagement between said drive portion and said driven portion having a predetermined range of play within which said driven portion is free of said motive force of said drive portion, said driven portion being driven by a plurality of rotations to drive said zoom drive system, while being driven by less than one rotation to drive said aperture drive system.

50. The switching system of claim 48, wherein said zoom drive system is driven in a first rotational direction to drive the zoom lens group in a wide-angle direction, said zoom drive system being driven in a second rotational direction to drive the zoom lens group in a telephoto direction, and wherein said aperture drive system is driven in one of said first and second rotational directions to control the aperture.

51. The switching system of claim 50, wherein said aperture drive system is driven in an other of said first and second rotational directions to reset the aperture.

52. The switching system of claim 51, wherein said aperture drive system is driven in said other direction, after said zoom drive system is driven in either of said first rotational direction and said second rotational direction, in order to create a predetermined range of play in said transmission.

* * * * *